United States Patent
Ichihara et al.

(10) Patent No.: US 9,156,266 B2
(45) Date of Patent: Oct. 13, 2015

(54) INK JET RECORDER

(71) Applicant: Seiko Epson Corporation, Tokyo (JP)

(72) Inventors: Keita Ichihara, Matsumoto (JP);
Atsushi Yoshida, Matsumoto (JP);
Masaki Uchiyama, Azumino (JP);
Hiroyuki Ito, Matsumoto (JP); Mitsuaki Yoshizawa, Minowa-machi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/217,597

(22) Filed: Mar. 18, 2014

(65) Prior Publication Data

US 2014/0292924 A1    Oct. 2, 2014

(30) Foreign Application Priority Data

Mar. 27, 2013 (JP) ................................ 2013-065768
Sep. 3, 2013  (JP) ................................ 2013-181902

(51) Int. Cl.
| | |
|---|---|
| *B41J 23/00* | (2006.01) |
| *B41J 2/01* | (2006.01) |
| *B41J 2/175* | (2006.01) |
| *B41J 2/165* | (2006.01) |
| *B41J 3/28* | (2006.01) |
| *C09D 11/00* | (2014.01) |
| *B41J 11/00* | (2006.01) |

(52) U.S. Cl.
CPC ............... *B41J 2/16508* (2013.01); *B41J 3/28* (2013.01); *C09D 11/00* (2013.01); *B41J 11/0085* (2013.01)

(58) Field of Classification Search
CPC .... B41J 19/202; B41J 19/17509; B41J 19/68; B41J 19/70; B41M 5/52
USPC ........................................... 347/37, 105, 101
See application file for complete search history.

(56) References Cited

U.S. PATENT DOCUMENTS

| | | | | |
|---|---|---|---|---|
| 5,917,508 | A | * | 6/1999 | Lopez et al. ...................... 347/4 |
| 6,000,781 | A | * | 12/1999 | Akiyama et al. ................. 347/40 |
| 2008/0309691 | A1 | * | 12/2008 | Takahashi ......................... 347/6 |
| 2009/0262151 | A1 | * | 10/2009 | Uchiyama et al. ................. 347/6 |
| 2009/0295888 | A1 | * | 12/2009 | Nitta et al. ....................... 347/89 |
| 2012/0224003 | A1 | * | 9/2012 | Lindenaar et al. ............... 347/37 |

FOREIGN PATENT DOCUMENTS

| | | |
|---|---|---|
| JP | 2010-023285 A | 2/2010 |
| JP | 2010-264624 A | 11/2010 |
| JP | 2012-045909 A | 3/2012 |

* cited by examiner

*Primary Examiner* — Matthew Luu
*Assistant Examiner* — Patrick King
(74) *Attorney, Agent, or Firm* — Harness, Dickey & Pierce, P.L.C.

(57) ABSTRACT

An ink jet recorder includes a support unit configured to support a recording medium, and a mobile unit including a plurality of containers containing inks of identical composition and a head configured to eject the ink supplied from any one of the plurality of containers. The ink jet recorder is configured to record an image on the recording medium in such a manner that the head performs main scanning by ejecting the ink while changing positions in a first direction, and the mobile unit performs sub-scanning by moving in a second direction intersecting with the first direction.

19 Claims, 3 Drawing Sheets

INK JET RECORDER

BACKGROUND

1. Technical Field

The present invention relates to ink jet recorders.

2. Related Art

Ink jet recorders perform recording of data such as images on recording media by ejecting fine ink droplets through nozzles of an ink jet recording head. Such ink jet recorders have various structures in accordance with the types and sizes of the recording media used.

For example, JP-A-2012-45909 discloses a so-called serial ink jet recorder. A serial ink jet recorder has a head which is movable in a first direction (the width direction of the recording surface of a recording medium), and performs recording of images by moving the recording medium in a second direction intersecting with the first direction while reciprocating the head in the first direction.

JP-A-2010-264624 discloses a flat-bed ink jet recorder. A flat-bed ink jet recorder has, for example, a panel configured to fix a recording medium, and a head which is movable in a first direction of the recording surface of the recording medium (the width direction of the recording medium) and in a second direction intersecting with the first direction. Images are recorded on the fixed recording medium while the head is moved in the first direction and in the second direction. In most cases, such flat-bed ink jet recorders are used for the recording on hard, heavy and frequently large-sized recording media such as glass sheets, acrylic sheets and metal sheets.

On the other hand, UV curable inks are widely used in ink jet recording on such hard and heavy recording media because of their excellent weather resistance and water resistance. Ink jet recorders which record images with UV curable inks are usually equipped with an illuminator for curing the inks deposited on the recording media. For example, JP-A-2010-23285 discloses a flat-bed UV (UV curable) ink jet recorder in which a UV illumination device is mounted on a mobile member (such as a carriage) together with a printing head.

Such flat-bed ink jet recorders described above sometimes have a mobile unit which is movable at least in the second direction, and the head is mounted on the mobile unit to attain movability in the second direction.

On the other hand, ink cartridges (containers) for supplying inks to the head are often connected to the head via supply tubes. In such cases, the length of the supply tubes is preferably as short as possible because the increase in the length of the supply tubes tends to raise the probability of problems such as the entry of air and the increase in the amount of precipitates of ink components. In order to reduce the length of supply tubes, ink cartridges are sometimes mounted on the mobile unit similarly to the head.

In the case where an ink cartridge mounted on a mobile unit has run out of the ink during recording of images, the recording of images has to be interrupted for the exchange of ink cartridges. When the recording is resumed, however, it is often encountered that the colors of the images are different between before and after the resumption as well as that the mobile unit is misaligned during the exchange of ink cartridges, resulting in unsatisfactory images. Such failures of image recording cause a significant loss particularly in the recording with a flat-bed ink jet recorder because this type of recording usually involves expensive materials (for example, recording media such as acrylic sheets, and UV curable inks).

Meanwhile, UV curable inks exhibit high viscosity ascribed to the components (for example, polymerizable compounds) and consequently have a difficulty in being ejected through a recording head at times. Thus, the UV curable inks are heated to lower the viscosity to a level suited for ejection before the inks are ejected through a recording head. For example, such heating of UV curable inks is performed with heating units having a heater or the like which are disposed in, for example, the recording head, the containers containing the UV curable inks, and the ink channels connecting the containers to the recording head.

On the other hand, the flat-bed ink jet recorder described above sometimes has a mobile unit which is movable in the second direction (the direction intersecting with the width direction of the recording surface of a recording medium), and the head is mounted on the mobile unit to attain movability in the second direction. In this case, it is preferable that the mobile unit be lightweight in order to remedy the load on devices such as a motor driving the mobile unit.

However, the weight of the mobile unit tends to be increased, particularly when UV curable inks are used, because components such as the aforementioned UV illumination device and ink containers are often mounted on the mobile unit in addition to the recording head. In such cases, further installation of the heating unit in the mobile unit significantly increases the load on devices associated with the mobile unit.

SUMMARY

Some aspects of the invention provide ink jet recorders which achieve excellent recording continuity performance and can record satisfactory images by solving at least part of the aforementioned problems.

Other aspects of the invention provide, by solving at least part of the above problems, ink jet recorders which realize a reduced load incurred during the moving of a mobile unit even in the recording with UV curable inks.

The first aspect of the invention is aimed at solving at least part of the aforementioned problems, and may be realized in the forms of the following embodiments or application examples.

APPLICATION EXAMPLE 1

An ink jet recorder according to an aspect of the invention includes: a support unit configured to support a recording medium, and a mobile unit including a plurality of containers containing inks of identical composition, and a head configured to eject the ink supplied from any one of the plurality of containers, the recorder being configured to record an image on the recording medium in such a manner that the head performs main scanning by ejecting the ink while changing positions in a first direction, and the mobile unit performs sub-scanning by moving in a second direction intersecting with the first direction.

APPLICATION EXAMPLE 2

In Application Example 1, the recorder may be configured such that when the amount of the ink contained in one of the plurality of containers is decreased to or below a prescribed amount, the ink contained in another container is supplied to the head.

APPLICATION EXAMPLE 3

In Application Example 1 or 2, the total of the initial volumes of the inks contained in the plurality of containers may be not more than 3500 ml and the initial volume of the ink contained in each of the plurality of containers may be not less than 500 ml, and the recorder may be used for the recording of an image on a recording medium having a recording surface with an area of 0.1 m² to 7 m².

APPLICATION EXAMPLE 4

In any one of Application Examples 1 to 3, the mobile unit may include one or more maintenance units configured to perform maintenance of the head.

APPLICATION EXAMPLE 5

In any one of Application Examples 1 to 4, the recorder may be free from a heating unit that heats the ink to obtain a viscosity suited for ejection.

APPLICATION EXAMPLE 6

In any one of Application Examples 1 to 5, the inks may be UV curable inks that are cured by UV illumination, and the mobile unit may include an illuminator including a UV emitting diode to induce curing of the UV curable inks.

APPLICATION EXAMPLE 7

In any one of Application Examples 1 to 6, the inks may be UV curable inks that are cured by UV illumination, and may contain an acylphosphine oxide compound as a photopolymerization initiator.

APPLICATION EXAMPLE 8

In any one of Application Examples 1 to 7, the mobile unit may be configured to permit an input unit to be mounted thereon, image data to be recorded on the recording medium being input into the input unit.

APPLICATION EXAMPLE 9

In Application Example 4, the total mass of the maintenance unit(s) mounted on the mobile unit may be not more than 5 kg.

APPLICATION EXAMPLE 10

In Application Example 4 or 9, the initial mass of the ink per one container of the plurality of containers may be smaller than the total mass of the maintenance unit(s) mounted on the mobile unit.

APPLICATION EXAMPLE 11

In any one of Application Examples 1 to 10, the head and each of the plurality of containers may be connected to each other via a supply tube, and the length of the supply tube may be not more than 3.5 m.

The second aspect of the invention is aimed at solving at least part of the aforementioned problems, and may be realized in the forms of the following embodiments or application examples.

APPLICATION EXAMPLE 1

An ink jet recorder according to an aspect of the invention includes: a support unit configured to support a recording medium, a container containing a UV curable ink, and a mobile unit including a head configured to eject the UV curable ink supplied from the container, the mobile unit being free from a heating unit that heats the UV curable ink to lower the viscosity, the recorder being configured to record an image on the recording medium in such a manner that the head performs main scanning by ejecting the UV curable ink while changing positions in a first direction, and the mobile unit performs sub-scanning by moving in a second direction intersecting with the first direction.

APPLICATION EXAMPLE 2

In Application Example 1, the viscosity of the UV curable ink at 20° C. may be not more than 20 mPa·s.

APPLICATION EXAMPLE 3

In Application Example 1 or 2, the UV curable ink may contain 40 mass % to 90 mass % of a monofunctional (meth) acrylate, and 5 mass % to 45 mass % of a difunctional or higher functional (meth)acrylate.

APPLICATION EXAMPLE 4

In any one of Application Examples 1 to 3, the UV curable ink may be a nonaqueous UV curable ink.

APPLICATION EXAMPLE 5

In any one of Application Examples 1 to 4, the temperature of the UV curable ink as ejected from the head may be not more than 35° C.

APPLICATION EXAMPLE 6

In any one of Application Examples 1 to 5, the mobile unit may include an illuminator including a UV emitting diode to induce curing of the UV curable ink.

APPLICATION EXAMPLE 7

In Application Example 6, the illuminator may be configured to cure the UV curable ink deposited on the recording medium with illumination energy of 200 mJ/cm² to 1500 mJ/cm² by illuminating the ink with UV radiation having an emission peak wavelength in the range of 350 nm to 420 nm.

APPLICATION EXAMPLE 8

In any one of Application Examples 1 to 7, the UV curable ink may contain a photopolymerization initiator, and the photopolymerization initiator may include an acylphosphine oxide compound.

APPLICATION EXAMPLE 9

In any one of Application Examples 1 to 8, the mobile unit may include one or more maintenance units configured to perform maintenance of the head.

APPLICATION EXAMPLE 10

In any one of Application Examples 1 to 9, the mobile unit may include a data processing section into which image data to be recorded on the recording medium is input and which converts the image data to a form of data suited for recording.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the first aspect of the invention will be discussed below. The embodiments described below only illustrate some examples of the invention, and the invention is not limited to such embodiments. Various modifications are possible without departing from the scope of the invention.

1. Ink Jet Recorders

An ink jet recorder according to an embodiment of the invention includes a support unit that has a panel configured to support a recording medium, and a mobile unit that includes a plurality of containers containing inks of identical composition and a head configured to eject the ink supplied from any one of the plurality of containers. The ink jet recorder is configured to record an image on the recording medium in such a manner that the head performs main scanning by ejecting the ink while changing positions in a first direction, and the mobile unit performs sub-scanning by moving in a second direction intersecting with the first direction.

Hereinbelow, configurations of the ink jet recorder and inks used in the recorder will be sequentially described in detail.

1.1. Recorder Configurations

The ink jet recorder in this embodiment is a so-called flat-bed ink jet recorder configured to record an image on a supported recording medium by moving the head in a first direction (in detail, the width direction on the recording surface of the recording medium) and in a second direction intersecting with the first direction (in detail, the direction perpendicular to the first direction on the recording surface of the recording medium).

A structure of the ink jet recorder according to this embodiment will be described in detail with reference to the drawings. The drawings may not be to scale to help understanding of the structure of the ink jet recorder of this embodiment.

Figure 1:
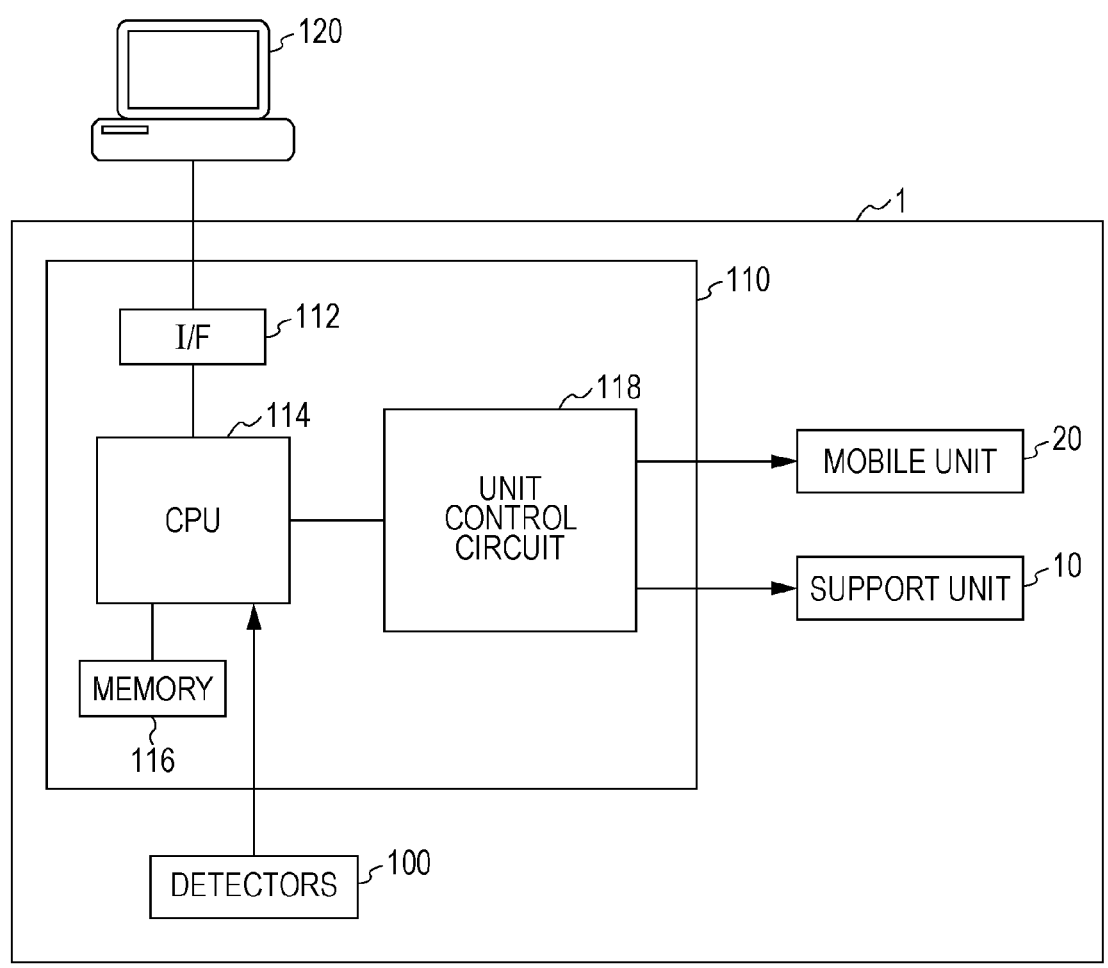
FIG. 1 is a block diagram illustrating a configuration of an ink jet recorder according to an embodiment of the invention.

FIG. 1 is a block diagram illustrating a configuration of an ink jet recorder 1 (hereinafter, also referred to as "printer 1") according to this embodiment.

Figure 2:
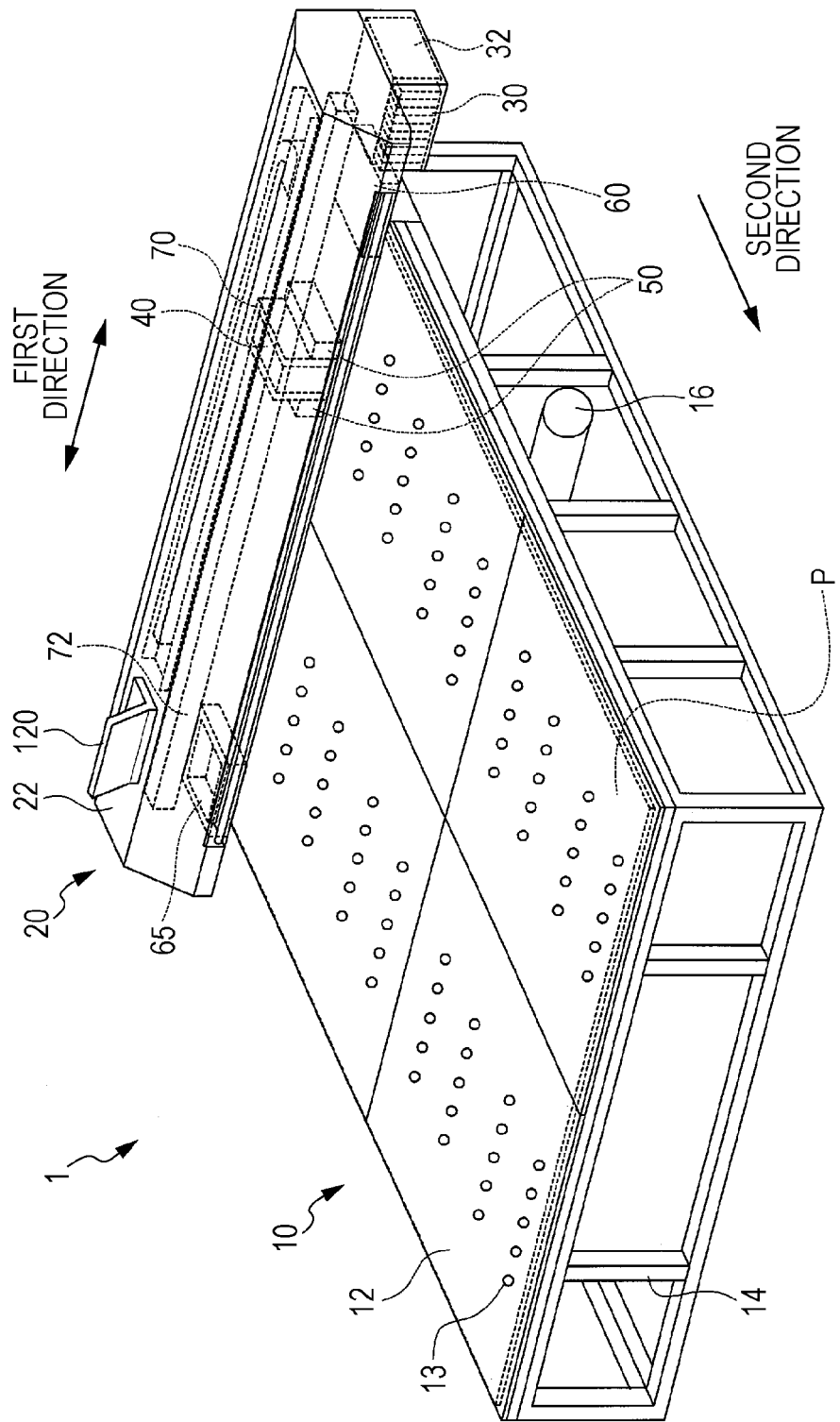
FIG. 2 is a perspective view schematically illustrating an ink jet recorder according to an embodiment of the invention.

FIG. 2 is a perspective view schematically illustrating the ink jet recorder 1 according to this embodiment. In FIG. 2, the first direction (the main scanning direction) is the width direction of the recording surface of a recording medium P placed on a panel 12, and coincides with the direction in which a mobile unit 20 extends. The second direction (the sub-scanning direction) in FIG. 2 is the direction intersecting with the first direction on the recording surface of the recording medium P, and coincides with the direction in which the mobile unit 20 moves during recording.

As illustrated in FIG. 1, the printer 1 includes a support unit 10, a mobile unit 20, detectors 100 and a controller 110. Image data is input to an input unit 120. The printer 1 receives the image data, and controls the units through the controller 110. The controller 110 controls the units based on the image data input from the input unit 120, and an image is recorded on the recording medium P. The status in the printer 1 is monitored with the detectors 100, and the detectors 100 output the detection results to the controller 110. The controller 110 controls the units based on the detection results output by the detectors 100. Image data may be input to the input unit 120 from other device that is not shown and be processed, for example, converted by the input unit 120, and such processed image data may be passed from the input unit 120 to the printer 1.

In more detail, the controller 110 is a control unit (a control section) for controlling the printer 1, and includes an interface section 112, a CPU 114, a memory 116 and a unit control circuit 118. The interface section 112 communicates data between the input unit 120 and the printer 1. The CPU 114 is a processor for performing the control of the entirety of the printer 1. The memory 116 ensures an area for storing the programs of the CPU 114 as well as ensures a working area, and includes memory elements such as RAM and EEPROM. The CPU 114 controls the units through the unit control circuit 118 according to the programs stored in the memory 116.

The input unit 120 is a device into which image data to be recorded on the recording medium P is input, and may be, for example, a personal computer or a touch-panel input device. The input unit 120 may include a function that converts image data input from other devices.

As illustrated in FIG. 2, the input unit 120 may be mounted on the mobile unit 20. In this manner, the length of wire cords connecting the input unit 120 to the mobile unit 20 may be advantageously shortened. The mobile unit 20 is preferably configured to permit the input unit 120 to be mounted thereon as is the case here. In detail, the mobile unit 20 preferably includes a fixing section to which the input unit 120 is fixed, and a terminal through which the image data output from the input unit 120 is input. Further, the input unit 120 may be mounted beforehand on the mobile unit 20. Such preliminary mounting is one embodiment of the mounting of the input unit 120.

Support Unit

In the embodiment illustrated in FIG. 2, the support unit 10 includes a panel 12 supporting a recording medium P, and thereby supports the recording medium P. During recording, the panel 12 of the support unit 10 supports the recording medium P by acting on the side of the recording medium P opposite to a head 40 so as to ensure that the recording medium P will not be misaligned accidentally in the direction opposed to the head 40. In the embodiment illustrated in FIG. 2, the support unit 10 further includes a support table 14 supporting the panel 12, and a suction unit 16 (for example, a vacuum pump or the like) disposed under the panel 12. Furthermore, the panel 12 has a plurality of suction holes 13 connected to the suction unit 16. By operating the suction unit 16, the recording medium P placed on the panel 12 is prevented from being misaligned accidentally on the panel 12 in the plane direction during recording. In the embodiment illustrated in FIG. 2, the recording medium P is a transparent sheet medium having a size covering a region that includes all the suction holes 13 in the panel 12. Although the suction unit 16 is illustrated as a unit that prevents the recording medium P on the panel 12 from being accidentally misaligned in the plane direction, the configuration is not limited thereto as long as the recording medium P is not accidentally misaligned on the panel 12 in the plane direction during recording. For example, the recording medium P may be attached to the panel 12 via a pressure-sensitive adhesive tape or the like. Alternatively, the recording medium P may be pressed with a pressing member giving a pressure thereto from above or the sides of the recording medium P. Still alternatively, the recording medium P may be prevented from being accidentally misaligned on the panel 12 in the plane direction by the action of its own weight. The support unit 10 is preferably located at a fixed position where the ink jet recorder is disposed. The printer 1 may be configured such that the recording medium P is transported over the panel 12.

Mobile Unit

In the embodiment illustrated in FIG. 2, the mobile unit 20 includes containers (ink cartridges) 30 containing inks, a head 40 configured to eject the ink supplied from the container 30, illuminators 50 disposed on both sides of the head 40 in the main scanning direction, a cap 60 that can cover the ejection face of the head 40, an ink tray 65 that will receive the ink discharged during a flushing operation of the head 40, and an input unit 120 into which image data is input. The cap 60 and the ink tray 65 represent one embodiment of the maintenance units used for the maintenance of the head as will be described later.

The mobile unit 20 performs sub-scanning by moving in the second direction during the recording of an image on the recording medium P. The mobile unit 20 may be caused to move in the second direction by a driving unit (not shown), for example, a driving belt disposed along the end of the panel 12. However, the configuration is not limited thereto and any known driving unit may be used.

In the embodiment illustrated in FIG. 2, the mobile unit 20 includes a cabinet 22. The head 40, the illuminators 50, the cap 60 and the ink tray 65 are accommodated in the cabinet 22. In the case where the inks are UV curable inks described later, the accommodation of the head 40 in the cabinet 22 is advantageous in that the ink attached to the nozzle face of the head 40 is suppressed from being cured by external light and consequently the occurrence of problems such as ejection failure may be reduced.

Containers

The containers 30 are so-called ink cartridges in which inks are contained. The containers 30 are detachably mounted on the mobile unit 20.

The containers 30 and the head 40 may be connected via supply tubes (not shown). In this case, the ink in the container 30 is supplied to the head 40 via the supply tube. The supply tubes are disposed for the respective containers 30, and may be, for example, plastic tube-shaped members (such as rubbers and elastomers).

The length of the supply tubes is preferably short because the increase in the length of the supply tubes tends to raise the probability of problems such as the entry of air in the supply tubes, the increase in the amount of precipitates of ink components, and the increase in the amount of a cleaning solution required for cleaning. The length of the supply tubes is preferably not more than 4 m, more preferably not more than 3.5 m, and still more preferably not more than 3.0 m. In order to increase the area of recording on the recording medium by extending the travel distance of the head 40, the length of the supply tubes is preferably not less than 1.0 m, more preferably not less than 1.5 m, and still more preferably not less than 2 m.

The containers 30 may be mounted on the mobile unit 20 by being inserted into a cartridge holder 32 disposed in the mobile unit 20. In the embodiment illustrated in FIG. 2, the containers 30 are disposed at the end of the mobile unit 20 in the first direction. However, the configuration is not limited thereto, and the containers 30 may be disposed at any location in the mobile unit 20. While the containers 30 are inserted along the second direction in the embodiment illustrated in FIG. 2, the cartridge holder 32 may be disposed at such a position that the containers 30 are inserted along the first direction.

The containers 30 may be mounted on a carriage 70 (described later). In the embodiment illustrated in FIG. 2, the containers 30 are not mounted on the carriage 70 (described later), but are mounted at a fixed position in the mobile unit 20. When the containers 30 are mounted on other than the carriage 70 (described later), the load incurred during the moving of the carriage 70 may be reduced by the absence of the weight of the containers 30. Thus, it is preferable that the containers 30 be mounted on the mobile unit at a location other than the carriage 70 (described later) which carries the head 40 and is reciprocated in the first direction.

In the embodiment illustrated in FIG. 2, ten containers 30 are arranged in line along the main scanning direction. However, the arrangement of the containers 30 is not particularly limited.

Here, it is necessary that the ink jet recorder of the invention have a plurality of containers containing inks of identical composition. During recording, the ink is supplied to the head from any one of the plurality of containers containing the inks of identical composition. With this configuration, recording may be performed continuously without interruption for the exchange of containers even when any one of the containers has run out of the ink, because the ink of identical composition may be supplied to the head from any of the other containers. As a result, the recording of images may be performed continuously for an extended period of time, in detail, until the recording of an image on any one recording medium is completed. Further, this configuration ensures satisfactory images by suppressing the occurrence of problems such as that the colors of the images are different between before and after the resumption of recording as well as that the mobile unit is misaligned during the exchange of ink cartridges, resulting in misaligned images.

In the invention, the term "inks of identical composition" refers to inks containing the same components in the same contents. Inks having the same name may be regarded as the inks of identical composition.

Figure 3:
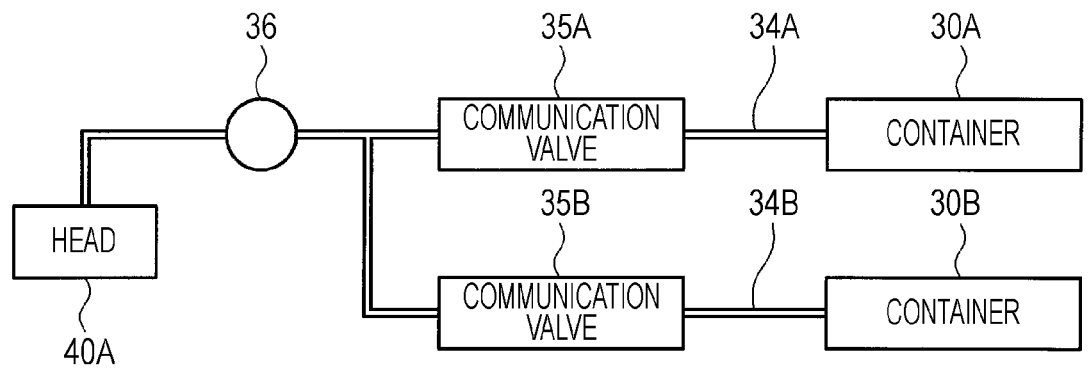
FIG. 3 is a schematic view illustrating a configuration for supplying an ink from a container to a head in an ink jet recorder according to an embodiment of the invention.

FIG. 3 is a schematic view illustrating a configuration for supplying an ink to a head 40A with a plurality of containers (containers 30A and 30B) containing the inks of identical composition. As illustrated in FIG. 3, the containers 30A and 30B are connected to the head 40A via a supply tube 34A and a supply tube 34B. The supply tubes 34A and 34B are provided with communication valves 35A and 35B that control the passage of the ink. The supply tubes 34A and 34B are connected to each other downstream (on the head 40A side from) the communication valves 35A and 35B. That is, the channels defined by the supply tubes 34A and 34B merge with each other at that point. Further, a feed pump 36 is disposed downstream (on the head 40A side from) the confluence of the supply tubes.

To start the execution of image recording, first, the communication valve 35A is opened and thereafter the feed pump 36 is operated to supply the ink in the container 30A to the head 40A. During this process, the communication valve 35B is closed to block the supply of the ink from the container 30B. When the amount of the ink in the container 30A is decreased to or below a prescribed amount (for example, when the remaining amount becomes 2% or below) during recording, the communication valve 35B is opened while closing the communication valve 35A to supply the ink in the container 30B to the head 40A. In this manner, one of the containers which has come close to the finish of the ink during recording may be switched to another container to supply the ink without interrupting the recording.

In the specification, the continuous supply of ink by switching a spent container to a new container without any interruption of recording may be sometimes referred to as the hot swapping function.

In the embodiment illustrated in FIG. 3, two containers containing inks of identical composition are illustrated. However, the configuration is not limited thereto, and continuous recording may be performed similarly with three or more containers containing inks of identical composition.

The ink jet recorder of the invention is preferably used for the recording of an image on a recording medium having a recording surface with an area of 0.1 $m^2$ to 7 $m^2$, more preferably 1 $m^2$ to 7 $m^2$, and still more preferably 2 $m^2$ to 6 $m^2$. The invention is particularly useful for the recording on an area in the above range because such records are highly visible when used in applications such as displays and also because recording on a single sheet of recording medium requires large amounts of inks. When the area of the recording surface is in the above range, the initial volume of the ink contained in each of the plurality of containers containing the inks of identical composition is preferably not less than 500 ml, more preferably not less than 600 ml, and still more preferably not less than 700 ml. Further, the total of the initial volumes of the inks contained in the containers is preferably not more than 3500 ml, more preferably not more than 3000 ml, and still more preferably not more than 2000 ml. By limiting the initial volume of the ink contained in each container to not less than 500 ml, the recording of an image on a single recording medium may be completed without interruption even when the recording surface of the recording medium has the above area. Further, the weight of the mobile unit may be reduced by limiting the total volume of the inks contained in the containers to not more than 3500 ml, thereby reducing the load incurred during the moving of the mobile unit.

The upper limit of the initial volume in each container is, although not limited to, preferably not more than 1750 ml, more preferably not more than 1500 ml, and still more preferably not more than 1000 ml. The lower limit of the total of the initial volumes in the containers is, although not limited to, preferably not less than 1000 ml, more preferably not less than 1200 ml, and still more preferably not less than 1400 ml. In the invention, the initial volume refers to the volume of the ink contained in the container before the use of the container.

Head

The head 40 has a nozzle face (not shown) disposed at a position opposed to the recording surface of the recording medium P, and ejects droplets of the ink through a plurality of nozzles (not shown) disposed in the nozzle face to deposit the droplets onto the recording surface of the recording medium P.

In the embodiment illustrated in FIG. 2, the head 40 is mounted on the carriage 70. The carriage 70 is attached by being supported by a guide rod 72 that is a support member spanned in the first direction, and is reciprocated by a carriage moving mechanism (not shown) in the first direction along the guide rod 72. The head 40 mounted on the carriage 70 is reciprocated in the first direction by such movement of the carriage 70. That is, recording on the recording medium P in the first direction takes place by the ejection of the ink from the head 40 with the movement of the carriage 70.

In the embodiment illustrated in FIG. 2, the carriage 70 is illustrated as a member that moves the head 40 in the first direction (that is, the head 40 is moved relative to the mobile unit 20). However, the configuration may be such that the mobile unit 20 itself is moved in the first direction in addition to the second direction (that is, the head 40 is not moved relative to the mobile unit 20).

While the embodiment in FIG. 3 illustrates a configuration in which the ink is supplied to the single head 40A from the plurality of containers (containers 30A and 30B) containing the inks of identical composition, the configuration is not limited thereto and may be such that heads are disposed for the respective containers containing the inks of identical composition. In this case, recording may be performed continuously by using the second head communicating with the container 30B after the finish of the supply of the ink to the first head communicating with the container 30A.

Any ink jet recording system may be utilized in the head 40. Examples of the ink jet recording systems which may be used include a system in which a strong electric field is applied between the nozzles and accelerating electrodes disposed ahead of the nozzles, then the ink is continuously ejected as droplets from the nozzles, and printing information signals are transmitted to the deflection electrodes while the ink droplets are flying between the deflection electrodes, or the ink droplets are ejected in accordance with the printing information signals without deflection (electrostatic attraction system); a system in which pressure is applied to the ink via a compact pump and the ink droplets are forcibly ejected by mechanically oscillating the nozzles with a crystal oscillator or the like; a system in which pressure and printing information signals are applied simultaneously to the ink with piezoelectric elements so as to eject the ink droplets and record an image (piezoelectric system); and a system in which the ink is heated and bubbled with small electrodes in accordance with printing information signals so as to eject the ink droplets and record an image (thermal jet system).

Illuminators

The ink jet recorder of this embodiment preferably includes an illuminator in the case where UV curable inks that are cured by UV illumination are used.

In the embodiment illustrated in FIG. 2, illuminators 50 are disposed on the carriage 70 that is mounted on the mobile unit 20, on both ends of the head 40 in the first direction. However, the configuration is not limited thereto and the illuminators may be disposed at any locations as long as UV radiation may be illuminated to the ink deposited on the recording surface of the recording medium P. For example, the illuminators may be disposed on the sides of the head 40 in the second direction so as to illuminate along the width direction (the first direction) of the recording medium, or such a configuration may be used in combination with the illuminators 50 disposed at the positions illustrated in FIG. 2.

The illuminator 50 includes a light source (not shown) and a light source controlling circuit (not shown) that controls switching on and off of the light source. The light source is preferably a UV emitting diode, in which case the increase in the size and weight of the light source may be avoided compared to when other light sources such as mercury lamps, metal halide lamps or other types of lamps are used.

When UV emitting diodes are used as the light sources, the wavelength of emitted UV radiation may be appropriately in the range of about 360 to 420 nm.

In order to increase the curing rate, to suppress the occurrence of curing wrinkles and to reduce the energy consumption, the illumination intensity of the illuminators is preferably 500 $mW/cm^2$ to 2000 $mW/cm^2$, and more preferably 700 $mW/cm^2$ to 2000 $mW/cm^2$.

In the curing step in which the ink is cured by illumination with the illuminators, the illumination energy is preferably 100 $mJ/cm^2$ to 2000 $mJ/cm^2$, more preferably 200 $mJ/cm^2$ to 1500 mJ/cm², still more preferably 200 mJ/cm² to 1000 mJ/cm², and particularly preferably 200 mJ/cm² to 800 mJ/cm² in order to ensure sufficient curing and to reduce the energy consumption.

Maintenance Unit

The ink jet recorder of this embodiment preferably has a maintenance unit. The maintenance unit is a mechanism used for the maintenance of the head to prevent the occurrence of problems such as nozzle clogging. The maintenance unit is preferably mounted on the mobile unit, whereby the head may be maintained during the driving of the mobile unit.

Examples of the operations for the maintenance of the head 40 include a moisture retention operation in which the head 40 is capped with the cap 60 to prevent the vaporization of the ink except when recording is being performed, a flushing operation in which the ink is discharged from the nozzles of the head 40 to the ink tray 65 to prevent the nozzle clogging with the viscous ink as well as to adjust the meniscus of the nozzles and allow the ink to be normally ejected from the head 40, a vacuum operation (head cleaning) in which after the head 40 is capped with the cap 60, a vacuum pump (not shown) is driven to forcibly suction the viscous ink and foreign matters such as dusts that have become attached to the nozzles, and thereby the meniscus is adjusted to allow the ink to be normally ejected from the head 40, and a wiping operation with a purge treatment in which the nozzle face of the head 40 is wiped with a wiper (not shown) to remove the ink which has become attached around the nozzles or has become viscous as well as to destroy the meniscus of the nozzles and readjust the meniscus.

As illustrated in FIG. 2, the cap 60 is disposed at one end of the mobile unit 20 in the first direction, and the ink tray 65 is disposed at the other end in the first direction. However, the configuration is not limited thereto, and these members may be disposed at any locations as long as they are mounted on the mobile unit 20 and do not interfere with the recording operation of the head 40.

In order to reduce the load incurred during the movement of the mobile unit 20, it is preferable that the maintenance units mounted on the mobile unit 20 be lightweight. For example, the mass of the maintenance units is preferably not more than 5 kg, and more preferably not more than 3 kg. The lower limit is, although not limited to, preferably not less than 0.5 kg, and more preferably not less than 1 kg.

Further, it is preferable that the initial mass of the ink per one container be smaller than the mass of the maintenance units mounted on the mobile unit 20. This configuration reduces the influence by the increased mass of the mobile unit 20 due to the increase in the number of containers as compared to by the mass of the maintenance units. Thus, the number of containers mounted on the mobile unit 20 may be increased. In this embodiment, the specific gravity of the ink is defined to be approximately 1 and thus, when the initial volume of the ink in the container is 700 ml, the initial mass is 700 g. When the specific gravity of the ink is other than 1, the initial mass of the ink may be obtained by multiplying the initial volume of the ink in the container by the specific gravity of the ink.

The maintenance unit is any one or more of a cap 60, a vacuum pump (not shown), an ink tray 65 and a wiper (not shown). When two or more of such units are used, the mass of the maintenance units is the total mass of the units.

Others

The ink jet recorder according to this embodiment may include a heating unit (such as a so-called electrical heater) to heat the ink and reduce the viscosity of the ink to a level suited for ejection. From the viewpoint of reducing the weight of the mobile unit 20, however, the ink jet recorder is preferably free from such a heating unit.

At the time of ejection, the viscosity of the ink is preferably not more than 13 mPa·s. In the case where the ink jet recorder has no heating units, the temperature of the ink during ejection is varied depending on the environment in which the ink jet recorder is placed. Provided that the temperature of the environment in which the ink jet recorder is placed usually ranges from about 20° C. to 30° C., the viscosity of the ink in this temperature range is preferably such that the ink may be ejected without heating, in detail, not more than 13 mPa·s at 20° C., more preferably in the range of 4 mPa·s to 13 mPa·s, and still more preferably 7 mPa·s to 13 mPa·s. This viscosity advantageously ensures satisfactory ejection and suppresses curing wrinkles. The ink viscosity may be measured with an E-type viscometer.

In order to control the ink viscosity in the above range, the proportions of components in the ink may be appropriately adjusted. For example, when UV curable inks described later are used, the viscosity may be controlled by controlling the proportions of polymerizable compounds.

1.2. Inks

Any usual ink jet recording inks may be used in the ink jet recorder of this embodiment. However, the use of UV curable inks is preferable because images can be favorably recorded on such recording media as glasses, acrylics and metals. Although UV curable inks are often more expensive than usual ink jet recording inks, the ink jet recorder of this embodiment reduces the occurrence of recording failures and thus suppresses wasteful consumption of the inks.

Hereinbelow, the chemical compositions of UV curable inks as an example of the inks used in the ink jet recorder of this embodiment will be described in detail.

1.2.1. Polymerizable Compounds

The inks in this embodiment may contain a polymerizable compound. Upon illumination with light, the polymerizable compound is polymerized by itself or by the action of a photopolymerization initiator described later, and the deposited ink is thus cured. The polymerizable compounds preferably include at least a vinyl ether group-containing (meth) acrylic acid ester represented by General Formula (I) and/or another monofunctional (meth)acrylate. In the invention, the term "(meth)acrylic acid" refers to both acrylic acid and methacrylic acid, and the term "(meth)acrylate" refers to both acrylate and methacrylate.

The polymerizable compounds will be described in detail focusing on these (meth)acrylates. Vinyl ether group-containing (meth)acrylic acid esters The ink in this embodiment preferably includes a vinyl ether group-containing (meth)acrylic acid ester represented by General Formula (I) below.

$$CH_2=CR^1-COOR^2-O-CH=CH-R^3 \quad (I)$$

In Formula (I), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

The vinyl ether group-containing (meth)acrylic acid ester gives excellent curability to the ink and lowers the viscosity of the ink. Further, the use of such a compound containing a vinyl ether group and a (meth)acrylic group in the molecule is more advantageous in achieving good curability of the ink than the separate use of a compound containing a vinyl ether group and a compound containing a (meth)acrylic group.

In General Formula (I), the divalent organic residue having 2 to 20 carbon atoms which is represented by $R^2$ is preferably a linear, branched or cyclic, and optionally substituted alkylene group having 2 to 20 carbon atoms, an optionally substituted alkylene group having 2 to 20 carbon atoms which has an oxygen atom derived from an ether bond and/or an ester bond in the structure, or an optionally substituted divalent aromatic group having 6 to 11 carbon atoms. Of these, alkylene groups having 2 to 6 carbon atoms such as ethylene group, n-propylene group, isopropylene group and butylene group; and alkylene groups having 2 to 9 carbon atoms which have an oxygen atom derived from an ether bond in the structure such as oxyethylene group, oxy-n-propylene group, oxyisopropylene group and oxybutylene group are preferably used.

In General Formula (I), the monovalent organic residue having 1 to 11 carbon atoms which is represented by $R^3$ is preferably a linear, branched or cyclic, and optionally substituted alkyl group having 1 to 10 carbon atoms, or an optionally substituted aromatic group having 6 to 11 carbon atoms. Of these, alkyl groups having 1 to 2 carbon atoms such as methyl group and ethyl group, and aromatic groups having 6 to 8 carbon atoms such as phenyl group and benzyl group are preferably used.

For the organic residues which may be substituted, the substituents are classified into groups having carbon atoms and groups having no carbon atoms. In the first case in which the substituents are groups having carbon atoms, the carbon atoms in the substituents are included in the number of the carbon atoms in the organic residues. Examples of the groups containing carbon atoms include, although not limited to, carboxyl groups and alkoxy groups. In the second case, examples of the groups having no carbon atoms include, although not limited to, hydroxyl group and halo groups.

Examples of the vinyl ether group-containing (meth)acrylates include, although not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, polyethylene glycol monovinyl ether (meth)acrylate, and polypropylene glycol monovinyl ether (meth)acrylate.

Of these, 2-(vinyloxyethoxy)ethyl (meth)acrylate, namely, at least one of 2-(vinyloxyethoxy)ethyl acrylate and 2-(vinyloxyethoxy)ethyl methacrylate is preferable, and 2-(vinyloxyethoxy)ethyl acrylate is more preferable because these (meth)acrylates can decrease the ink viscosity to a lower level, have a high ignition point and are excellent in terms of curability of the ink. In particular, the ink viscosity can be decreased to a markedly low level because 2-(vinyloxyethoxy)ethyl acrylate and 2-(vinyloxyethoxy)ethyl methacrylate have simple structures and low molecular weights. Examples of the 2-(vinyloxyethoxy)ethyl methacrylates include 2-(2-vinyloxyethoxy)ethyl methacrylate and 2-(1-vinyloxyethoxy)ethyl methacrylate. Examples of the 2-(vinyloxyethoxy)ethyl acrylates include 2-(2-vinyloxyethoxy)ethyl acrylate and 2-(1-vinyloxyethoxy)ethyl acrylate. The 2-(vinyloxyethoxy)ethyl acrylates outperform the 2-(vinyloxyethoxy)ethyl methacrylates in terms of curability.

The vinyl ether group-containing (meth)acrylic acid esters may be used singly, or two or more may be used in combination.

The content of the vinyl ether group-containing (meth)acrylic acid ester, in particular, 2-(vinyloxyethoxy)ethyl (meth)acrylate, is preferably 20 mass % to 90 mass %, more preferably 40 mass % to 80 mass %, and still more preferably 50 mass % to 75 mass % with respect to the total mass of the ink (100 mass %). This lower limit of the content ensures that the ink viscosity may be lowered and the curability of the ink may be further enhanced. On the other hand, the upper limit of the content ensures that good storage stability of the ink may be maintained and the occurrence of curing wrinkles may be prevented further effectively.

Examples of the methods for producing the vinyl ether group-containing (meth)acrylic acid esters include, although not limited to, the esterification of (meth)acrylic acid with a hydroxyl group-containing vinyl ether (production method B), the esterification of a (meth)acrylic acid halide with a hydroxyl group-containing vinyl ether (production method C), the esterification of (meth)acrylic acid anhydride with a hydroxyl group-containing vinyl ether (production method D), the transesterification between a (meth)acrylic acid ester and a hydroxyl group-containing vinyl ether (production method E), the esterification of (meth)acrylic acid with a halogen-containing vinyl ether (production method F), the esterification of an alkali (or alkaline earth) metal (meth)acrylate with a halogen-containing vinyl ether (production method G), the vinyl exchange reaction of a hydroxyl group-containing (meth)acrylic acid ester with vinyl carboxylate (production method H), and the ether exchange reaction of a hydroxyl group-containing (meth)acrylic acid ester with an alkyl vinyl ether (production method I).

Of these methods, the production method E is preferable because the advantageous effects according to this embodiment are enhanced.

Monofunctional (meth)acrylates

The ink in this embodiment preferably contains a monofunctional (meth)acrylate instead of or in addition to the vinyl ether group-containing (meth)acrylic acid ester. By containing the monofunctional (meth)acrylate, the ink shows a low viscosity and allows a photopolymerization initiator and other additives to exhibit excellent solubility in the ink. Further, the use of the monofunctional (meth)acrylate facilitates obtaining good ejection stability during ink jet recording, and enhances the toughness, the heat resistance and the chemical resistance of the obtainable records.

Examples of the monofunctional (meth)acrylates include phenoxyethyl (meth)acrylate, isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 4-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butylcyclohexyl (meth)acrylate, dicyclopentanyl (meth)acrylate, dicyclopentenyloxyethyl (meth)acrylate, benzyl (meth)acrylate, ethoxylated nonylphenyl (meth)acrylate, alkoxylated nonylphenyl (meth)acrylate, and p-cumyl phenol EO-modified (meth)acrylate.

Of these, those monofunctional (meth)acrylates having an aromatic ring backbone in the molecule are preferable because further improvements are obtained in curability, storage stability and solubility of photopolymerization initiators. Preferred examples of the monofunctional (meth)acrylates having an aromatic ring backbone include, although not limited to, phenoxyethyl (meth)acrylate, benzyl (meth)acrylate, 2-hydroxyphenoxypropyl (meth)acrylate and phenoxydiethylene glycol (meth)acrylate. Of these, at least one of phenoxyethyl (meth)acrylate and benzyl (meth)acrylate is preferable, and phenoxyethyl (meth)acrylate is more preferable because the ink viscosity may be reduced as well as because excellent properties are obtained in terms of all of curability, abrasion resistance, adhesion and solubility of photopolymerization initiators.

The monofunctional (meth)acrylates other than the vinyl ether group-containing (meth)acrylic acid esters may be used singly, or two or more may be used in combination.

The content of the monofunctional (meth)acrylate other than the vinyl ether group-containing (meth)acrylic acid ester is preferably 10 mass % to 50 mass %, and more preferably 20 mass % to 40 mass % with respect to the total mass of the ink (100 mass %). This lower limit of the content ensures that the solubility of a photopolymerization initiator in addition to curability will be further enhanced. On the other hand, the upper limit of the content ensures that the adhesion in addition to curability will be further enhanced.

From such viewpoints as curability, suppression of curing wrinkles and solubility of photopolymerization initiators, the content of the vinyl ether group-containing (meth)acrylic acid ester and/or the monofunctional (meth)acrylate other than the vinyl ether group-containing (meth)acrylic acid ester is preferably 40 mass % to 90 mass %, more preferably 55 mass % to 80 mass %, and still more preferably 60 mass % to 80 mass % with respect to the total mass of the ink (100 mass %).

Additional Polymerizable Compounds

The ink in this embodiment may further contain a polymerizable compound other than those described above (hereinafter, referred to as "additional polymerizable compound"). The additional polymerizable compounds may be any of various known monofunctional, difunctional, trifunctional and higher functional monomers and oligomers. Examples of the monomers include unsaturated carboxylic acids such as (meth)acrylic acid, itaconic acid, crotonic acid, isocrotonic acid and maleic acid as well as salts and esters thereof, urethanes, amides and anhydrides thereof, acrylonitrile, styrene, various unsaturated polyesters, unsaturated polyethers, unsaturated polyamides and unsaturated urethanes. Examples of the oligomers include oligomers formed of the above monomers such as linear acrylic oligomers, and epoxy (meth)acrylates, oxetane (meth)acrylates, aliphatic urethane (meth)acrylates, aromatic urethane (meth)acrylates and polyester (meth)acrylates.

Of the additional polymerizable compounds, difunctional and higher functional (meth)acrylic acid esters, namely, difunctional and higher functional (meth)acrylates are preferable, and difunctional to hexafunctional (meth)acrylates are more preferable.

Examples of the difunctional (meth)acrylates include diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, neopentyl glycol hydroxypivalate di(meth)acrylate, and polytetramethylene glycol di(meth)acrylate.

Examples of the trifunctional and higher functional (meth)acrylates include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

The additional polymerizable compounds may be used singly, or two or more may be used in combination.

From such viewpoints as curability, suppression of curing wrinkles and solubility of photopolymerization initiators, the content of the additional polymerizable compound, if any contained in the ink, is preferably 5 mass % to 45 mass %, more preferably 5 mass % to 35 mass %, and still more preferably 5 mass % to 30 mass % with respect to the total mass of the ink (100 mass %). In the case where the ink contains an additional polymerizable compound that is a trifunctional or higher functional (meth)acrylate, the content thereof is preferably 5 mass % to 20 mass %, more preferably 5 mass % to 15 mass %, and still more preferably 5 mass % to 10 mass % with respect to the total mass of the ink (100 mass %).

Curing wrinkles are probably caused when the curing inside the ink proceeds slower than the curing of the ink surface and consequently the ink surface is deformed by the progress of the curing inside the ink. In this embodiment, such curing wrinkles are advantageously suppressed when the ink contains a difunctional or higher functional (meth)acrylic acid ester.

The addition of photopolymerization initiators may be omitted by using photopolymerizable compounds as the polymerizable compounds. However, the use of photopolymerization initiators is more advantageous because the initiation of polymerization may be easily controlled.

1.2.2. Photopolymerization Initiators

The ink in this embodiment may further contain a photopolymerization initiator. The photopolymerization initiator may be used to induce photopolymerization by the illumination with radiation and to cure the ink deposited on the recording surface of the recording medium, thereby forming a print. Of the radiations, ultraviolet (UV) radiation may be advantageously used because of its safety as well as because the costs of light source lamps may be saved. The photopolymerization initiators which may be used are not limited as long as active species such as radicals or cations are generated by the application of UV energy to induce the polymerization of the polymerizable compounds. Radical or cation photopolymerization initiators may be used. In particular, radical photopolymerization initiators may be preferably used.

Examples of the radical photopolymerization initiators include aromatic ketones, acylphosphine oxide compounds, aromatic onium salt compounds, organic peroxides, thio compounds (such as thioxanthone compounds and thiophenyl group-containing compounds), hexaarylbiimidazole compounds, ketoxime ester compounds, borate compounds, azinium compounds, metallocene compounds, active ester compounds, compounds having a carbon-halogen bond, and alkylamine compounds. Of these, acylphosphine oxide compounds are preferable because the curability of the ink may be further enhanced particularly when UV emitting diodes are used.

Specific examples of the radical photopolymerization initiators include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio) phenyl]-2-morpholino-propan-1-one, bis-(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Examples of commercially available radical photopolymerization initiators include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl) phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (a mixture of oxyphenyl acetic acid 2-[2-oxo-2-phenylacetoxyethoxy]ethyl ester and oxyphenyl acetic acid 2-(2-hydroxyethoxy)ethyl ester) (product names, manufactured by BASF), KAYACURE DETX-S (2,4-diethylthioxanthone) (product name, manufactured by Nippon Kayaku Co., Ltd.), Speedcure TPO (2,4,6-trimethylbenzoyl-diphenyl-phosphine oxide), Speedcure DETX (2,4-diethylthioxanthen-9-one) (product names, manufactured by Lambson), Lucirin TPO, LR8893, LR8970 (product names, manufactured by BASF), and UBECRYL P36 (product name, manufactured by UCB).

The photopolymerization initiators may be used singly, or two or more may be used in combination.

In order to ensure that the UV curing rate is increased and excellent curability is obtained as well as to prevent incomplete dissolution of the photopolymerization initiator and to prevent coloring ascribed to the photopolymerization initiator, the content of the photopolymerization initiator is preferably not more than 20 mass % with respect to the total mass of the ink (100 mass %). Particularly in the case in which the photopolymerization initiator includes an acylphosphine oxide compound, the content thereof is more preferably 5 mass % to 15 mass %, and still more preferably 7 mass % to 13 mass % with respect to the total mass of the ink (100 mass %). This lower limit of the content ensures that curability is further enhanced. In more detail, the curability is further enhanced because a sufficient curing rate is obtained during curing particularly with UV emitting diodes (preferably having an emission peak wavelength of 360 nm to 420 nm). On the other hand, the upper limit of the content ensures that the solubility of the photopolymerization initiator is further enhanced.

1.2.3. Coloring Materials

The ink in this embodiment may further contain a coloring material. The coloring material may be at least one of a pigment and a dye.

By using a pigment as the coloring material, the light resistance of the ink may be enhanced. The pigments may be any of inorganic pigments and organic pigments.

Examples of the inorganic pigments which may be used include carbon blacks (C.I. pigment black 7) such as furnace black, lamp black, acetylene black and channel black, iron oxide and titanium oxide.

Examples of the organic pigments include azo pigments such as insoluble azo pigments, condensed azo pigments, azo lakes and chelate azo pigments; polycyclic pigments such as phthalocyanine pigments, perylene and perinone pigments, anthraquinone pigments, quinacridone pigments, dioxane pigments, thioindigo pigments, isoindolinone pigments and quinophthalone pigments; dye chelates (such as basic dye chelates and acidic dye chelates), dye lakes (basic dye lakes and acidic dye lakes), nitro pigments, nitroso pigments, aniline blacks, and daylight fluorescent pigments.

The pigments may be used singly, or two or more may be used in combination.

When the pigment is used, the average particle diameter thereof is preferably not more than 300 nm, and is more preferably 50 nm to 200 nm. This average particle diameter ensures that the ink is further enhanced in terms of reliability such as ejection stability and dispersion stability as well as that high quality images may be formed. In the specification, the average particle diameter may be measured by a dynamic light scattering method.

The dyes are not particularly limited, and any of acidic dyes, direct dyes, reactive dyes and basic dyes may be used. The dyes may be used singly, or two or more may be used in combination.

1.2.4. Dispersants

In the case where the ink in this embodiment contains the pigment, the ink may further contain a dispersant to enhance the dispersibility of the pigment. The dispersants are not particularly limited. For example, dispersants generally used to prepare pigment dispersions such as polymer dispersants may be used. Specific examples thereof include those which contain at least one main component selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers and epoxy resins. Examples of commercially available polymer dispersants include AJISPER series (product names) manufactured by Ajinomoto Fine-Techno Co., Inc., Solsperse series (such as Solsperse 32000 and 36000 (product names)) available from Avecia Co., DISPERBYK series (product names) manufactured by BYK Chemie, and DISPARLON series (product names) manufactured by KUSUMOTO Chemicals, Ltd.

The dispersants may be used singly, or two or more may be used in combination. The content of the dispersants is not particularly limited, and the dispersants may be appropriately added in suitable amounts.

1.2.5. Polymerization Inhibitors

The ink in this embodiment may further contain a polymerization inhibitor. The presence of a polymerization inhibitor in the ink prevents the polymerization reaction of the polymerizable compounds before curing.

The polymerization inhibitors are not particularly limited. For example, phenolic polymerization inhibitors may be used. Examples of the phenolic polymerization inhibitors include, although not limited to, p-methoxyphenol, cresol, t-butylcatechol, di-t-butylparacresol, hydroquinone monomethyl ether, α-naphthol, 3,5-di-t-butyl-4-hydroxytoluene, 2,6-di-t-butyl-4-methylphenol, 2,2'-methylene-bis(4-methyl-6-t-butylphenol), 2,2'-methylene-bis(4-ethyl-6-butylphenol), and 4,4'-thio-bis(3-methyl-6-t-butylphenol).

Examples of commercially available phenolic polymerization inhibitors include p-methoxyphenol (manufactured by Tokyo Chemical Industry Co., Ltd., product name, p-methoxyphenol), NONFLEX MBP (manufactured by Seiko Chemical Co., Ltd., product name, 2,2'-methylene-bis(4-methyl-6-t-butylphenol)) and BHT SWANOX (manufactured by Seiko Chemical Co., Ltd., product name, 2,6-di-t-butyl-4-methylphenol).

The polymerization inhibitors may be used singly, or two or more may be used in combination. The content of the polymerization inhibitors is not particularly limited, and the polymerization inhibitors may be appropriately added in suitable amounts.

1.2.6. Surfactants

The ink in this embodiment may further contain a surfactant. The surfactants are not particularly limited. For example, silicone surfactants such as polyester-modified silicones and polyether-modified silicones may be used. It is particularly preferable to use polyether-modified polydimethylsiloxane or polyester-modified polydimethylsiloxane. Examples of commercially available slipping agents include BYK-347, BYK-348, and BYK-UV3500, 3510, 3530 and 3570 (manufactured by BYK).

The surfactants may be used singly, or two or more may be used in combination. The content of the surfactants is not particularly limited, and the surfactants may be appropriately added in suitable amounts.

1.2.7. Other Additives

The ink in this embodiment may contain additives (components) other than the aforementioned additives. Such components are not particularly limited. Examples include known polymerization accelerators, penetration enhancers, wetting agents (humectants), and further additives. Examples of the further additives include known fixing agents, mildew-proofing agents, preservatives, antioxidants, UV absorbers, chelating agents, pH adjusters and thickening agents.

1.2.8. Illumination Energy

When the UV curable inks described above are used, it is preferable to use such UV curable inks which are cured with illumination energy of not more than 1000 mJ/cm$^2$, more preferably not more than 300 mJ/cm$^2$, still more preferably not more than 200 mJ/cm$^2$, and particularly preferably not more than 100 mJ/cm$^2$ from the viewpoint that the power consumption by the illuminators may be saved.

1.3. Recording Media

The ink jet recorder of this embodiment may be used for the recording on any types of recording media used in flat-bed ink jet recorders (such as papers, woven articles, knitted articles, nonwoven fabrics, leathers, resin films, resin sheets, glasses and metals). On any of these recording media, the ink jet recorder of the invention may produce records with satisfactory image quality with a reduced probability of failures such as misaligned images or variations in color tone. Thus, the inventive ink jet recorder may be suitably used even for the recording on expensive recording media (such as metals, acrylics and glasses) where a significant loss is incurred in the event of recording failure.

The recording medium used in the flat-bed ink jet recorder is a single sheet. For example, the length of the recording surface in the second direction when the sheet is supported on the panel of the support unit 10 may be not more than 4 m, particularly not more than 3 m and may be not less than 0.5 m, particularly not less than 1 m.

Preferred embodiments of the second aspect of the invention will be discussed below. The embodiments described below only illustrate some examples of the invention, and the invention is not limited to such embodiments. Various modifications are possible without departing from the scope of the invention.

1. Ink Jet Recorders

An ink jet recorder according to an embodiment of the invention includes a support unit configured to support a recording medium, a container containing a UV curable ink, and a mobile unit including a head configured to eject the UV curable ink supplied from the container, the mobile unit being free from a heating unit that heats the UV curable ink to lower the viscosity. The ink jet recorder is configured to record an image on the recording medium in such a manner that the head performs main scanning by ejecting the UV curable ink while changing positions in a first direction, and the mobile unit performs sub-scanning by moving in a second direction intersecting with the first direction.

Hereinbelow, configurations of the ink jet recorder and inks used in the recorder will be sequentially described in detail.

1.1. Recorder Configurations

The ink jet recorder in this embodiment is a so-called flat-bed ink jet recorder configured to record an image on a supported recording medium by moving the head in a first direction (in detail, the width direction on the recording surface of the recording medium) and in a second direction intersecting with the first direction (in detail, the direction perpendicular to the first direction on the recording surface of the recording medium).

A structure of the ink jet recorder according to this embodiment will be described in detail with reference to the drawings. The drawings may not be to scale to help understanding of the structure of the ink jet recorder of this embodiment.

FIG. 1 is a block diagram illustrating a configuration of an ink jet recorder 1 (hereinafter, also referred to as "printer 1") according to this embodiment.

FIG. 2 is a perspective view schematically illustrating the ink jet recorder 1 according to this embodiment. In FIG. 2, the first direction (the main scanning direction) is the width direction of the recording surface of a recording medium P placed on a panel 12, and coincides with the direction in which a mobile unit 20 extends. The second direction (the sub-scanning direction) in FIG. 2 is the direction intersecting with the first direction on the recording surface of the recording medium P, and coincides with the direction in which the mobile unit 20 moves during recording.

As illustrated in FIG. 1, the printer 1 includes a support unit 10, a mobile unit 20, detectors 100 and a controller 110. Image data is input to an input unit 120. The printer 1 receives the image data, and controls the units through the controller 110. The controller 110 controls the units based on the image data input from the input unit 120, and an image is recorded on the recording medium P. The status in the printer 1 is monitored with the detectors 100, and the detectors 100 output the detection results to the controller 110. The controller 110 controls the units based on the detection results output by the detectors 100. Image data may be input to the input unit 120 from other device that is not shown and be processed, for example, converted by the input unit 120, and such processed image data may be passed from the input unit 120 to the printer 1.

In more detail, the controller 110 is a control unit (a control section) for controlling the printer 1, and includes an interface section 112, a CPU 114, a memory 116 and a unit control circuit 118. The interface section 112 communicates data between the input unit 120 and the printer 1. The CPU 114 is a processor for performing the control of the entirety of the printer 1. The memory 116 ensures an area for storing the programs of the CPU 114 as well as ensures a working area, and includes memory elements such as RAM and EEPROM. The CPU 114 controls the units through the unit control circuit 118 according to the programs stored in the memory 116.

The input unit 120 is a device into which image data to be recorded on the recording medium P is input, and may be, for example, a personal computer (PC) or a touch-panel input device. The input unit 120 may include a function that converts image data input from other devices. The input unit 120 is an example of the data processing section in the application examples. For example, the input unit 120 is a personal computer having a printer driver installed therein that controls the ink jet recorder. The input unit 120 (PC) performs data processing in which the image data before data processing (for example, JPEG format image data) is converted to a data format suited for the ink jet recorder to record on the recording medium (for example, dot format image data).

As illustrated in FIG. 2, the input unit 120 may be mounted on the mobile unit 20. In this manner, the length of wire cords connecting the input unit 120 to the mobile unit 20 may be advantageously shortened. Thus, the mobile unit 20 is preferably configured to permit the input unit 120 to be mounted thereon. In detail, the mobile unit 20 preferably includes a fixing section to which the input unit 120 is fixed, and a terminal through which the image data output from the input unit 120 is input. Further, the input unit 120 may be mounted beforehand on the mobile unit 20. Such preliminary mounting is one embodiment of the mounting of the input unit 120.

Support Unit

In the embodiment illustrated in FIG. 2, the support unit 10 includes a panel 12 supporting a recording medium P, and thereby supports the recording medium P. During recording, the panel 12 of the support unit 10 supports the recording medium P by acting on the side of the recording medium P opposite to a head 40 so as to ensure that the recording medium P will not be misaligned accidentally in the direction opposed to the head 40. In the embodiment illustrated in FIG. 2, the support unit 10 further includes a support table 14 supporting the panel 12, and a suction unit 16 (for example, a vacuum pump or the like) disposed under the panel 12. Furthermore, the panel 12 has a plurality of suction holes 13 connected to the suction unit 16. By operating the suction unit 16, the recording medium P placed on the panel 12 is prevented from being misaligned accidentally on the panel 12 in the plane direction during recording. In the embodiment illustrated in FIG. 2, the recording medium P is a transparent sheet medium having a size covering a region that includes all the suction holes 13 in the panel 12.

Although the suction unit 16 is illustrated as a unit that prevents the recording medium P on the panel 12 from being accidentally misaligned in the plane direction, the configuration is not limited thereto as long as the recording medium P is not accidentally misaligned on the panel 12 in the plane direction during recording. For example, the recording medium P may be attached to the panel 12 via a pressure-sensitive adhesive tape or the like. Alternatively, the recording medium P may be pressed with a pressing member giving a pressure thereto from above or the sides of the recording medium P. Still alternatively, the recording medium P may be prevented from being accidentally misaligned on the panel 12 in the plane direction by the action of its own weight. The support unit 10 is preferably located at a fixed position where the ink jet recorder is disposed.

In order to transport the recording medium P over the panel 12, the support unit 10 may include a transport mechanism (such as transport rollers) that is not shown.

Mobile Unit

In the embodiment illustrated in FIG. 2, the mobile unit 20 includes containers (ink cartridges) 30 containing inks, a head 40 configured to eject the ink supplied from the container 30, illuminators 50 disposed on both sides of the head 40 in the main scanning direction, a cap 60 that can cover the ejection face of the head 40, an ink tray 65 that will receive the ink discharged during a flushing operation of the head 40, and an input unit 120 into which image data is input, and the mobile unit 20 does not include any heating units described later. The cap 60 and the ink tray 65 represent one embodiment of the maintenance units used for the maintenance of the head as will be described later.

The mobile unit 20 performs sub-scanning by moving in the second direction during the recording of an image on the recording medium P. The mobile unit 20 may be caused to move in the second direction by a driving unit (not shown), for example, a combination of a driving belt disposed along the end of the panel 12, and a motor or the like. However, the configuration is not limited thereto and any known driving unit may be used.

Although the embodiment in FIG. 2 illustrates a configuration in which the mobile unit 20 itself is moved in the second direction, the configuration is not limited thereto and may be such that the mobile unit 20 itself is moved in the first direction in addition to the second direction (that is, the head 40 is not moved relative to the mobile unit 20).

In the embodiment illustrated in FIG. 2, the mobile unit 20 includes a cabinet 22. The head 40, the illuminators 50, the cap 60 and the ink tray 65 are accommodated in the cabinet 22. In the use of UV curable inks, in particular UV curable inks described later, the accommodation of the head 40 in the cabinet 22 is advantageous in that the ink attached to the nozzle face of the head 40 is suppressed from being cured by external light and consequently the occurrence of problems such as ejection failure may be reduced.

In the ink jet recorder of this embodiment, the mobile unit 20 does not carry any heating units described later. Thus, the weight of the mobile unit may be saved, and consequently the load incurred during the movement of the mobile unit may be reduced.

Containers

The containers 30 are so-called ink cartridges in which UV curable inks are contained. In the embodiment illustrated in FIG. 2, the containers 30 are detachably mounted on the mobile unit 20.

The containers 30 and the head 40 may be connected via supply tubes (not shown). In this case, the ink in the container 30 is supplied to the head 40 via the supply tube. The supply tubes are disposed for the respective containers 30, and may be, for example, plastic tube-shaped members (such as rubbers and elastomers).

The length of the supply tubes is preferably short because the increase in the length of the supply tubes tends to raise the probability of problems such as the entry of air in the supply tubes, the increase in the amount of precipitates of ink components, and the increase in the amount of a cleaning solution required for cleaning. In order to reduce the occurrence of problems associated with the inks or the cleaning solution, the containers 30 are preferably disposed near the head 40 while ensuring that the operation of the head 40 is not limited. Thus, as illustrated in FIG. 2, it is preferable that the containers 30 be mounted on the mobile unit 20 together with the head 40. In the case where the containers 30 are mounted on the mobile unit 20, the length of the supply tubes is preferably not more than 4 m, more preferably not more than 3.5 m, and still more preferably not more than 3.0 m. In order to increase the area of recording on the recording medium by extending the travel distance of the head 40, the length of the supply tubes is preferably not less than 1.0 m, more preferably not less than 1.5 m, and still more preferably not less than 2 m.

In contrast, the weight saving of the mobile unit 20 favors the absence of the containers 30 on the mobile unit. The location of the containers 30 may be determined in consideration of the aforementioned problems during recording. In the case where, for example, the components in the ink are resistant to precipitation, the weight saving of the mobile unit 20 may be prioritized and the containers 30 may be disposed at any position on the printer 1 except on the mobile unit 20.

In the embodiment illustrated in FIG. 2, the containers 30 are mounted on the mobile unit 20 by being inserted into a cartridge holder 32 disposed in the mobile unit 20. In the embodiment illustrated in FIG. 2, the containers 30 are disposed at the end of the mobile unit 20 in the first direction. However, the configuration is not limited thereto, and the containers 30 may be disposed at any location in the mobile unit 20. While the containers 30 are inserted along the second direction in the embodiment illustrated in FIG. 2, the cartridge holder 32 may be disposed at such a position that the containers 30 are inserted along the first direction.

The containers 30 may be mounted on a carriage 70 (described later). In the embodiment illustrated in FIG. 2, the containers 30 are not mounted on the carriage 70 (described later), but are mounted at a fixed position in the mobile unit 20. When the containers 30 are mounted on other than the carriage 70 (described later), the load incurred during the moving of the carriage 70 may be reduced by the absence of the weight of the containers 30. Thus, it is preferable that the containers 30 be mounted on the mobile unit 20 at a location other than the carriage 70 (described later) which carries the head 40 and is reciprocated in the first direction.

In the embodiment illustrated in FIG. 2, ten containers 30 are arranged in line along the main scanning direction. However, the arrangement of the containers 30 is not particularly limited, and the number of mounted containers is not particularly limited.

Here, the ink jet recorder of this embodiment may have a plurality of containers containing inks of identical composition. In this case, the ink jet recorder is preferably configured such that, during recording, the ink is supplied to the head from any one of the plurality of containers containing the inks of identical composition. With this configuration, recording may be performed continuously without interruption for the exchange of containers even when any one of the containers has run out of the ink, because the ink of identical composition may be supplied to the head from any of the other containers. As a result, the recording of images may be performed continuously for an extended period of time, in detail, until the recording of an image on any one recording medium is completed. Further, this configuration ensures satisfactory images by suppressing the occurrence of problems such as that the colors of the images are different between before and after the resumption of recording as well as that the mobile unit is misaligned during the exchange of ink cartridges, resulting in misaligned images.

In the invention, the term "inks of identical composition" refers to inks containing the same components in the same contents. Inks having the same name may be regarded as the inks of identical composition.

FIG. 3 is a schematic view illustrating a configuration for supplying an ink to a head 40A with a plurality of containers (containers 30A and 30B) containing the inks of identical composition. As illustrated in FIG. 3, the containers 30A and 30B are connected to the head 40A via a supply tube 34A and a supply tube 34B. The supply tubes 34A and 34B are provided with communication valves 35A and 35B that control the passage of the ink. The supply tubes 34A and 34B are connected to each other downstream (on the head 40A side from) the communication valves 35A and 35B. That is, the channels defined by the supply tubes 34A and 34B merge with each other at that point. Further, a feed pump 36 is disposed downstream (on the head 40A side from) the confluence of the supply tubes.

To start the execution of image recording, first, the communication valve 35A is opened and thereafter the feed pump 36 is operated to supply the ink in the container 30A to the head 40A. During this process, the communication valve 35B is closed to block the supply of the ink from the container 30B. When the amount of the ink in the container 30A is decreased to or below a prescribed amount (for example, when the remaining amount becomes 2% or below) during recording, the communication valve 35B is opened while closing the communication valve 35A to supply the ink in the container 30B to the head 40A. In this manner, one of the containers which has come close to the finish of the ink during recording may be switched to another container to supply the ink without interrupting the recording.

In the specification, the continuous supply of ink by switching a spent container to a new container without any interruption of recording may be sometimes referred to as the hot swapping function.

In the embodiment illustrated in FIG. 3, two containers containing inks of identical composition are illustrated. However, the configuration is not limited thereto, and continuous recording may be performed similarly with three or more containers containing inks of identical composition. Further, two or more containers containing inks of identical composition may be disposed only for inks which are used more frequently.

In the ink jet recorder of the invention, the hot swapping function may be omitted when the hot swapping function is not required. In such a configuration, every ink containers contain inks of different compositions. The effect of the inventive configuration in which the mobile unit is free from any heating units is particularly appreciated when the hot swapping function is added because the addition of such a function increases the weight of the mobile unit 20.

The ink jet recorder of the invention is preferably used for the recording of an image on a recording medium having a recording surface with an area of 0.1 $m^2$ to 7 $m^2$, more preferably 1 $m^2$ to 7 $m^2$, and still more preferably 2 $m^2$ to 6 $m^2$. Records having an area in the above range are highly visible when used in applications such as displays. Further, the hot swapping function is particularly useful for such recording because recording on a single sheet of recording medium requires large amounts of inks.

When the area of the recording medium is in the above range and when there is a plurality of containers containing inks of identical composition, the initial volume of the ink contained in each of the containers is preferably not less than 500 ml, more preferably not less than 600 ml, and still more preferably not less than 700 ml. Further, the total of the initial volumes of the inks contained in the containers is preferably not more than 3500 ml, more preferably not more than 3000 ml, and still more preferably not more than 2000 ml. By limiting the initial volume of the ink contained in each container to not less than 500 ml, the recording of an image on a single recording medium may be completed without interruption even when the recording surface of the recording medium has the above area. Further, the weight of the mobile unit may be reduced by limiting the total volume of the inks contained in the containers to not more than 3500 ml, thereby reducing the load incurred during the moving of the mobile unit.

The upper limit of the initial volume in each container is, although not limited to, preferably not more than 1750 ml, more preferably not more than 1500 ml, and still more preferably not more than 1000 ml. The lower limit of the total of the initial volumes in the containers is, although not limited to, preferably not less than 1000 ml, more preferably not less than 1200 ml, and still more preferably not less than 1400 ml. In the invention, the initial volume refers to the volume of the ink contained in the container before the use of the container.

Head

The head 40 has a nozzle face (not shown) disposed at a position opposed to the recording surface of the recording medium P, and ejects droplets of the ink through a plurality of nozzles (not shown) disposed in the nozzle face to deposit the droplets onto the recording surface of the recording medium P.

In the embodiment illustrated in FIG. 2, the head 40 is mounted on the carriage 70. The carriage 70 is attached by being supported by a guide rod 72 that is a support member spanned in the first direction, and is reciprocated by a carriage moving mechanism (not shown) in the first direction along the guide rod 72. The head 40 mounted on the carriage 70 is reciprocated in the first direction by such movement of the carriage 70. That is, recording on the recording medium P in the first direction takes place by the ejection of the ink from the head 40 with the movement of the carriage 70.

In the embodiment illustrated in FIG. 2, the carriage 70 is illustrated as a member that moves the head 40 in the first direction (that is, the head 40 is moved relative to the mobile unit 20). However, the configuration may be such that the mobile unit 20 itself is moved in the first direction in addition to the second direction (that is, the head 40 is not moved relative to the mobile unit 20).

While FIG. 3 illustrates a configuration in which the ink jet recorder in this embodiment has the hot swapping function and the ink is supplied to the single head 40A from the plurality of containers (containers 30A and 30B) containing the inks of identical composition, the configuration is not limited thereto and may be such that heads are disposed for the respective containers containing the inks of identical composition. In this case, recording may be performed continuously by using the second head communicating with the container 30B after the finish of the supply of the ink to the first head communicating with the container 30A.

Any ink jet recording system may be utilized in the head 40. Examples of the ink jet recording systems which may be used include a system in which a strong electric field is applied between the nozzles and accelerating electrodes disposed ahead of the nozzles, then the ink is continuously ejected as droplets from the nozzles, and printing information signals are transmitted to the deflection electrodes while the ink droplets are flying between the deflection electrodes, or the ink droplets are ejected in accordance with the printing information signals without deflection (electrostatic attraction system); a system in which pressure is applied to the ink via a compact pump and the ink droplets are forcibly ejected by mechanically oscillating the nozzles with a crystal oscillator or the like; a system in which pressure and printing information signals are applied simultaneously to the ink with piezoelectric elements so as to eject the ink droplets and record an image (piezoelectric system); and a system in which the ink is heated and bubbled with small electrodes in accordance with printing information signals so as to eject the ink droplets and record an image (thermal jet system).

Illuminators

The ink jet recorder of this embodiment preferably includes an illuminator to cure UV curable inks deposited onto the recording media.

In the embodiment illustrated in FIG. 2, illuminators 50 are disposed on the carriage 70 that is mounted on the mobile unit 20, on both ends of the head 40 in the first direction. However, the configuration is not limited thereto and the illuminators may be disposed at any locations as long as UV radiation may be illuminated to the ink deposited on the recording surface of the recording medium P. For example, the illuminators may be disposed on the sides of the head 40 in the second direction so as to illuminate along the width direction (the first direction) of the recording medium, or such a configuration may be used in combination with the illuminators 50 disposed at the positions illustrated in FIG. 2.

The illuminator 50 includes a light source (not shown) and a light source controlling circuit (not shown) that controls switching on and off of the light source. The light source is preferably a UV emitting diode. In this case, the increase in the size and weight of the light source may be avoided compared to when other light sources such as mercury lamps, metal halide lamps or other types of lamps are used, thereby reducing the load incurred during the movement of the mobile unit 20.

When UV emitting diodes are used as the light sources, the emission peak wavelength of emitted UV radiation may be appropriately in the range of 350 to 420 nm.

In order to increase the curing rate, to suppress the occurrence of curing wrinkles and to reduce the energy consumption, the illumination intensity of the illuminators is preferably 500 mW/$cm^2$ to 2000 mW/$cm^2$, and more preferably 700 mW/$cm^2$ to 2000 mW/$cm^2$.

When the ink is cured by illumination with the illuminators, the illumination energy is preferably 100 mJ/cm² to 2000 mJ/cm², more preferably 200 mJ/cm² to 1500 mJ/cm², still more preferably 200 mJ/cm² to 1000 mJ/cm², and particularly preferably 200 mJ/cm² to 800 mJ/cm² in order to ensure sufficient curing and to reduce the energy consumption.

Maintenance Unit

The ink jet recorder of this embodiment preferably has a maintenance unit. The maintenance unit is a mechanism used for the maintenance of the head to prevent the occurrence of problems such as nozzle clogging. The maintenance unit is preferably mounted on the mobile unit 20, whereby the head may be maintained during the driving of the mobile unit 20.

Examples of the operations for the maintenance of the head 40 include a moisture retention operation in which the head 40 is capped with the cap 60 to prevent the vaporization of the ink except when recording is being performed, a flushing operation in which the ink is discharged from the nozzles of the head 40 to the ink tray 65 to prevent the nozzle clogging with the viscous ink as well as to adjust the meniscus of the nozzles and allow the ink to be normally ejected from the head 40, a vacuum operation (head cleaning) in which after the head 40 is capped with the cap 60, a vacuum pump (not shown) is driven to forcibly suction the viscous ink and foreign matters such as dusts that have become attached to the nozzles, and thereby the meniscus is adjusted to allow the ink to be normally ejected from the head 40, and a wiping operation with a purge treatment in which the nozzle face of the head 40 is wiped with a wiper (not shown) to remove the ink which has become attached around the nozzles or has become viscous as well as to destroy the meniscus of the nozzles and readjust the meniscus.

As illustrated in FIG. 2, the cap 60 is disposed at one end of the mobile unit 20 in the first direction, and the ink tray 65 is disposed at the other end in the first direction. However, the configuration is not limited thereto, and these members may be disposed at any locations as long as they are mounted on the mobile unit 20 and do not interfere with the recording operation of the head 40.

In order to reduce the load incurred during the movement of the mobile unit 20, it is preferable that the maintenance units mounted on the mobile unit 20 be lightweight. For example, the mass of the maintenance units is preferably not more than 5 kg, and more preferably not more than 3 kg. The lower limit is, although not limited to, preferably not less than 0.5 kg, and more preferably not less than 1 kg.

Further, it is preferable that the initial mass of the ink per one container be smaller than the mass of the maintenance units mounted on the mobile unit 20. This configuration reduces the influence by the increased mass of the mobile unit 20 due to the increase in the number of containers as compared to by the mass of the maintenance units. Thus, the number of containers mounted on the mobile unit 20 may be increased. In this embodiment, the specific gravity of the ink is defined to be approximately 1 and thus, when the initial volume of the ink in the container is 700 ml, the initial mass is 700 g. When the specific gravity of the ink is other than 1, the initial mass of the ink may be obtained by multiplying the initial volume of the ink in the container by the specific gravity of the ink.

The maintenance unit is any one or more of a cap 60, a vacuum pump (not shown), an ink tray 65 and a wiper (not shown). When two or more of such units are used, the mass of the maintenance units is the total mass of the units.

Heating Units

In the use of UV curable inks (in particular, substantially water-free UV curable inks described later), it is usually necessary that the high ink viscosity be lowered before ejection. Because of this need, heating units that heat the ink to lower the viscosity to a level suited for ejection are often disposed at, for example, containers 30, supply tubes and a head 40. In the use of UV curable inks, however, it is often the case that a mobile unit 20 in a printer 1 carries members such as illuminators 50 and maintenance units described above in addition to the head 40. Thus, the weight of the mobile unit 20 tends to be increased.

In order to reduce the increase in weight of the mobile unit 20, the ink jet recorder of the invention is configured such that the mobile unit 20 is free from heating units (such as electrical heaters) that heat the ink and lower the ink viscosity. Thus, the weight reduction of the mobile unit 20 may be realized.

The invention does not eliminate the possibility that heating units be disposed at any locations in the printer 1 except on the mobile unit 20. However, an ink viscosity suited for ejection may be obtained without heating by using UV curable inks having a preferred composition described later, and thus no heating units will be necessary on the printer 1. The absence of heating units on the printer 1 advantageously allows the printer 1 to be miniaturized and simplified.

1.2. UV Curable Inks

UV curable inks are used in the ink jet recorder of this embodiment. With UV curable inks, records may be favorably produced on such recording media as glasses, acrylics and metals.

Hereinbelow, components which may be contained in the UV curable inks used in the ink jet recorder of this embodiment will be described in detail.

1.2.1. Polymerizable Compounds

The UV curable inks in this embodiment preferably contain a polymerizable compound. Upon illumination with light, the polymerizable compound is polymerized by itself or by the action of a photopolymerization initiator described later, and the deposited ink is thus cured.

Hereinbelow, the polymerizable compounds which may be used in the UV curable inks in this embodiment will be described with respect to monofunctional (meth)acrylates and polymerizable compounds other than the monofunctional (meth)acrylates (hereinafter, also referred to as "additional polymerizable compounds"). In the invention, the term "(meth)acrylic acid" refers to both acrylic acid and methacrylic acid, and the term "(meth)acrylate" refers to both acrylate and methacrylate.

Monofunctional (meth)acrylates

The UV curable inks in this embodiment preferably contain a monofunctional (meth)acrylate. A low viscosity may be obtained when the UV curable ink contains a monofunctional (meth)acrylate, and thus the UV curable inks may be ejected without disposing heating units on the aforementioned ink jet recorder.

The content of the monofunctional (meth)acrylate is preferably 40 mass % to 90 mass %, more preferably 55 mass % to 80 mass %, and still more preferably 60 mass % to 80 mass % with respect to the total mass of the ink (100 mass %). When the content of the monofunctional (meth)acrylate is 40 mass % or above, a low viscosity may be easily obtained and thus the UV curable inks attain a viscosity suited for the ejection in the ink jet recorder. When the content of the monofunctional (meth)acrylate is 90 mass % or below, the viscosity of the UV curable inks does not become excessively low and consequently the occurrence of problems such as curing wrinkles on images may be suppressed.

Hereinbelow, the monofunctional (meth)acrylates will be described with respect to vinyl ether group-containing (meth)acrylates and monofunctional (meth)acrylates other than the vinyl ether group-containing (meth)acrylates (hereinafter, also referred to as "further monofunctional (meth)acrylates").

Specific examples of the vinyl ether group-containing (meth)acrylates include compounds represented by General Formula (I) below.

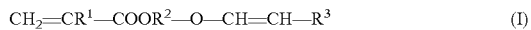

In Formula (I), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

The vinyl ether group-containing (meth)acrylate gives excellent curability to the ink and lowers the viscosity of the ink. Further, the use of such a compound containing a vinyl ether group and a (meth)acrylic group in the molecule is more advantageous in achieving good curability of the ink than the separate use of a compound containing a vinyl ether group and a compound containing a (meth)acrylic group.

In General Formula (I), the divalent organic residue having 2 to 20 carbon atoms which is represented by $R^2$ is preferably a linear, branched or cyclic, and optionally substituted alkylene group having 2 to 20 carbon atoms, an optionally substituted alkylene group having 2 to 20 carbon atoms which has an oxygen atom derived from an ether bond and/or an ester bond in the structure, or an optionally substituted divalent aromatic group having 6 to 11 carbon atoms. Of these, alkylene groups having 2 to 6 carbon atoms such as ethylene group, n-propylene group, isopropylene group and butylene group; and alkylene groups having 2 to 9 carbon atoms which have an oxygen atom derived from an ether bond in the structure such as oxyethylene group, oxy-n-propylene group, oxyisopropylene group and oxybutylene group are preferably used.

In General Formula (I), the monovalent organic residue having 1 to 11 carbon atoms which is represented by $R^3$ is preferably a linear, branched or cyclic, and optionally substituted alkyl group having 1 to 10 carbon atoms, or an optionally substituted aromatic group having 6 to 11 carbon atoms. Of these, alkyl groups having 1 to 2 carbon atoms such as methyl group and ethyl group, and aromatic groups having 6 to 8 carbon atoms such as phenyl group and benzyl group are preferably used.

For the organic residues which may be substituted, the substituents are classified into groups having carbon atoms and groups having no carbon atoms. In the first case in which the substituents are groups having carbon atoms, the carbon atoms in the substituents are included in the number of the carbon atoms in the organic residues. Examples of the groups containing carbon atoms include, although not limited to, carboxyl groups and alkoxy groups. In the second case, examples of the groups having no carbon atoms include, although not limited to, hydroxyl group and halo groups.

Examples of the vinyl ether group-containing (meth)acrylates include, although not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth) acrylate, polyethylene glycol monovinyl ether (meth)acrylate, and polypropylene glycol monovinyl ether (meth)acrylate.

Of these, 2-(vinyloxyethoxy)ethyl (meth)acrylate, namely, at least one of 2-(vinyloxyethoxy)ethyl acrylate and 2-(vinyloxyethoxy)ethyl methacrylate is preferable, and 2-(vinyloxyethoxy)ethyl acrylate is more preferable because these (meth)acrylates can decrease the ink viscosity to a lower level, have a high ignition point and are excellent in terms of curability of the ink. In particular, the ink viscosity can be decreased to a markedly low level because 2-(vinyloxyethoxy)ethyl acrylate and 2-(vinyloxyethoxy)ethyl methacrylate have simple structures and low molecular weights. Examples of the 2-(vinyloxyethoxy)ethyl methacrylates include 2-(2-vinyloxyethoxy)ethyl methacrylate and 2-(1-vinyloxyethoxy)ethyl methacrylate. Examples of the 2-(vinyloxyethoxy)ethyl acrylates include 2-(2-vinyloxyethoxy)ethyl acrylate and 2-(1-vinyloxyethoxy)ethyl acrylate. The 2-(vinyloxyethoxy)ethyl acrylates outperform the 2-(vinyloxyethoxy)ethyl methacrylates in terms of curability.

The vinyl ether group-containing (meth)acrylates may be used singly, or two or more may be used in combination.

The content of the vinyl ether group-containing (meth)acrylate (in particular, 2-(vinyloxyethoxy)ethyl (meth)acrylate) is preferably 20 mass % to 90 mass %, more preferably 40 mass % to 80 mass %, and still more preferably 50 mass % to 75 mass % with respect to the total mass of the UV curable ink (100 mass %). This lower limit of the content ensures that the ink viscosity may be lowered and the curability of the ink may be further enhanced. On the other hand, the upper limit of the content ensures that good storage stability of the ink may be maintained and the occurrence of curing wrinkles may be prevented further effectively.

Examples of the methods for producing the vinyl ether group-containing (meth)acrylates include, although not limited to, the esterification of (meth)acrylic acid with a hydroxyl group-containing vinyl ether (production method B), the esterification of a (meth)acrylic acid halide with a hydroxyl group-containing vinyl ether (production method C), the esterification of (meth)acrylic acid anhydride with a hydroxyl group-containing vinyl ether (production method D), the transesterification between a (meth)acrylic acid ester and a hydroxyl group-containing vinyl ether (production method E), the esterification of (meth)acrylic acid with a halogen-containing vinyl ether (production method F), the esterification of an alkali (or alkaline earth) metal (meth)acrylate with a halogen-containing vinyl ether (production method G), the vinyl exchange reaction of a hydroxyl group-containing (meth)acrylic acid ester with vinyl carboxylate (production method H), and the ether exchange reaction of a hydroxyl group-containing (meth)acrylic acid ester with an alkyl vinyl ether (production method I). Of these methods, the production method E is preferable because the advantageous effects according to this embodiment are enhanced.

The UV curable ink in this embodiment may contain a further monofunctional (meth)acrylate instead of or in addition to the vinyl ether group-containing (meth)acrylate. By containing the further monofunctional (meth)acrylate, the ink shows a low viscosity and allows a photopolymerization initiator and other additives to exhibit excellent solubility in the ink. Further, the use of the further monofunctional (meth)acrylate facilitates obtaining good ejection stability during ink jet recording, and enhances the toughness, the heat resistance and the chemical resistance of the obtainable records.

Examples of the further monofunctional (meth)acrylates include phenoxyethyl (meth)acrylate, isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 4-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butylcyclohexyl (meth)acrylate, dicyclopentanyl (meth)acrylate, dicyclopentenyloxyethyl (meth)acrylate, benzyl (meth)acrylate, ethoxylated nonylphenyl (meth)acrylate, alkoxylated nonylphenyl (meth)acrylate, and p-cumyl phenol EO-modified (meth)acrylate.

Of these further monofunctional (meth)acrylates, those monofunctional (meth)acrylates having an aromatic ring backbone in the molecule are preferable because further improvements are obtained in curability, storage stability and solubility of photopolymerization initiators. Preferred examples of the further monofunctional (meth)acrylates having an aromatic ring backbone include, although not limited to, phenoxyethyl (meth)acrylate, benzyl (meth)acrylate, 2-hydroxyphenoxypropyl (meth)acrylate and phenoxydiethylene glycol (meth)acrylate. Of these, at least one of phenoxyethyl (meth)acrylate and benzyl (meth)acrylate is preferable, and phenoxyethyl (meth)acrylate is more preferable because the ink viscosity may be reduced as well as because excellent properties are obtained in terms of all of curability, abrasion resistance, adhesion and solubility of photopolymerization initiators.

The further monofunctional (meth)acrylates may be used singly, or two or more may be used in combination.

The content of the further monofunctional (meth)acrylate is preferably 10 mass % to 50 mass %, and more preferably 20 mass % to 40 mass % with respect to the total mass of the UV curable ink (100 mass %). This lower limit of the content ensures that the solubility of a photopolymerization initiator in addition to curability will be further enhanced. On the other hand, the upper limit of the content ensures that the adhesion in addition to curability will be further enhanced.

Additional Polymerizable Compounds

The UV curable ink in this embodiment may contain a polymerizable compound other than the monofunctional (meth)acrylates described above, namely, may contain an "additional polymerizable compound".

The additional polymerizable compounds may be any of various known monofunctional, difunctional, trifunctional and higher functional monomers and oligomers. Examples of the monomers include unsaturated carboxylic acids such as (meth)acrylic acid, itaconic acid, crotonic acid, isocrotonic acid and maleic acid as well as salts and esters thereof, urethanes, amides and anhydrides thereof, acrylonitrile, styrene, various unsaturated polyesters, unsaturated polyethers, unsaturated polyamides and unsaturated urethanes. Examples of the oligomers include oligomers formed of the above monomers such as linear acrylic oligomers, and epoxy (meth)acrylates, oxetane (meth)acrylates, aliphatic urethane (meth)acrylates, aromatic urethane (meth)acrylates and polyester (meth)acrylates.

Of the additional polymerizable compounds, difunctional and higher functional (meth)acrylic acid esters, namely, difunctional and higher functional (meth)acrylates are preferable, and difunctional to hexafunctional (meth)acrylates are more preferable.

Examples of the difunctional (meth)acrylates include diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, neopentyl glycol hydroxypivalate di(meth)acrylate, and polytetramethylene glycol di(meth)acrylate.

Examples of the trifunctional and higher functional (meth)acrylates include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

The additional polymerizable compounds may be used singly, or two or more may be used in combination.

From such viewpoints as curability, suppression of curing wrinkles and solubility of photopolymerization initiators, the content of the additional polymerizable compound (in particular, difunctional or higher functional (meth)acrylate), if any contained in the UV curable ink, is preferably 5 mass % to 45 mass %, more preferably 5 mass % to 35 mass %, and still more preferably 5 mass % to 30 mass % with respect to the total mass of the UV curable ink (100 mass %). In the case where the ink contains an additional polymerizable compound that is a trifunctional or higher functional (meth)acrylate, the content thereof is preferably 5 mass % to 20 mass %, more preferably 5 mass % to 15 mass %, and still more preferably 5 mass % to 10 mass % with respect to the total mass of the ink (100 mass %).

In particular, a viscosity suited for ink jet recording (for example, 20 mPa·s or less at 20° C.) may be easily obtained by the use of a UV curable ink containing 40 mass % to 90 mass % of a monofunctional (meth)acrylate and 5 mass % to 45 mass % of a difunctional or higher functional (meth)acrylate.

Curing wrinkles are probably caused when the curing inside the ink proceeds slower than the curing of the ink surface and consequently the ink surface is deformed by the progress of the curing inside the ink. In this embodiment, such curing wrinkles are advantageously suppressed when the UV curable ink contains a difunctional or higher functional (meth)acrylate.

The addition of photopolymerization initiators may be omitted by using photopolymerizable compounds as the polymerizable compounds. However, the use of photopolymerization initiators is more advantageous because the initiation of polymerization may be easily controlled.

1.2.2. Photopolymerization Initiators

The UV curable ink in this embodiment preferably contains a photopolymerization initiator. The photopolymerization initiator may be used to induce photopolymerization by the illumination with UV radiation and to cure the ink deposited on the recording surface of the recording medium, thereby forming a print. The use of ultraviolet (UV) radiation is advantageous over other radiations because of its safety as well as because the costs of light source lamps may be saved. The photopolymerization initiators which may be used are not limited as long as active species such as radicals or cations are generated by the application of UV energy to induce the polymerization of the polymerizable compounds. Radical or cation photopolymerization initiators may be used. In particular, radical photopolymerization initiators may be preferably used.

Examples of the radical photopolymerization initiators include aromatic ketones, acylphosphine oxide compounds, aromatic onium salt compounds, organic peroxides, thio compounds (such as thioxanthone compounds and thiophenyl group-containing compounds), hexaarylbiimidazole compounds, ketoxime ester compounds, borate compounds, azinium compounds, metallocene compounds, active ester compounds, compounds having a carbon-halogen bond, and alkylamine compounds. Of these, acylphosphine oxide compounds are preferable because the curability of the ink may be further enhanced particularly when UV emitting diodes are used.

Specific examples of the radical photopolymerization initiators include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, bis-(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Examples of commercially available radical photopolymerization initiators include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis($\eta$5-2,4-cyclopentadien-1-yl)-bis(2,6-difluoro-3-(1H-pyrrol-1-yl)-phenyl)titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (a mixture of oxyphenyl acetic acid 2-[2-oxo-2-phenylacetoxyethoxy]ethyl ester and oxyphenyl acetic acid 2-(2-hydroxyethoxy)ethyl ester) (product names, manufactured by BASF), KAYACURE DETX-S (2,4-diethylthioxanthone) (product name, manufactured by Nippon Kayaku Co., Ltd.), Speedcure TPO (2,4,6-trimethylbenzoyl-diphenyl-phosphine oxide), Speedcure DETX (2,4-diethylthioxanthen-9-one) (product names, manufactured by Lambson), Lucirin TPO, LR8893, LR8970 (product names, manufactured by BASF), and UBECRYL P36 (product name, manufactured by UCB).

The photopolymerization initiators may be used singly, or two or more may be used in combination.

In order to ensure that the UV curing rate is increased and excellent curability is obtained as well as to prevent incomplete dissolution of the photopolymerization initiator and to prevent coloring ascribed to the photopolymerization initiator, the content of the photopolymerization initiator is preferably not more than 20 mass % with respect to the total mass of the UV curable ink (100 mass %). Particularly in the case in which the photopolymerization initiator includes an acylphosphine oxide compound, the content thereof is more preferably 5 mass % to 15 mass %, and still more preferably 7 mass % to 13 mass % with respect to the total mass of the UV curable ink (100 mass %). This lower limit of the content ensures that curability is further enhanced. In more detail, the curability is further enhanced because a sufficient curing rate is obtained during curing particularly with UV emitting diodes (preferably having an emission peak wavelength of 350 nm to 420 nm). On the other hand, the upper limit of the content ensures that the solubility of the photopolymerization initiator is further enhanced.

1.2.3. Coloring Materials

The UV curable ink in this embodiment may contain a coloring material. The coloring material may be at least one of a pigment and a dye.

By using a pigment as the coloring material, the light resistance of the ink may be enhanced. The pigments may be any of inorganic pigments and organic pigments.

Examples of the inorganic pigments which may be used include carbon blacks (C.I. pigment black 7) such as furnace black, lamp black, acetylene black and channel black, iron oxide and titanium oxide.

Examples of the organic pigments include azo pigments such as insoluble azo pigments, condensed azo pigments, azo lakes and chelate azo pigments; polycyclic pigments such as phthalocyanine pigments, perylene and perinone pigments, anthraquinone pigments, quinacridone pigments, dioxane pigments, thioindigo pigments, isoindolinone pigments and quinophthalone pigments; dye chelates (such as basic dye chelates and acidic dye chelates), dye lakes (basic dye lakes and acidic dye lakes), nitro pigments, nitroso pigments, aniline blacks, and daylight fluorescent pigments.

The pigments may be used singly, or two or more may be used in combination.

When the pigment is used, the average particle diameter thereof is preferably not more than 300 nm, and is more preferably 50 nm to 200 nm. This average particle diameter ensures that the ink is further enhanced in terms of reliability such as ejection stability and dispersion stability as well as that high quality images may be formed. In the specification, the average particle diameter may be measured by a dynamic light scattering method.

The dyes are not particularly limited, and any of acidic dyes, direct dyes, reactive dyes and basic dyes may be used. The dyes may be used singly, or two or more may be used in combination.

1.2.4. Dispersants

In the case where the UV curable ink in this embodiment contains the pigment, the ink may further contain a dispersant to enhance the dispersibility of the pigment. The dispersants are not particularly limited. For example, dispersants generally used to prepare pigment dispersions such as polymer dispersants may be used. Specific examples thereof include those which contain at least one main component selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers and epoxy resins. Examples of commercially available polymer dispersants include AJISPER series (product names) manufactured by Ajinomoto Fine-Techno Co., Inc., Solsperse series (such as Solsperse 32000 and 36000 (product names)) available from Avecia Co., DISPERBYK series (product names) manufactured by BYK Chemie, and DISPARLON series (product names) manufactured by KUSUMOTO Chemicals, Ltd.

The dispersants may be used singly, or two or more may be used in combination. The content of the dispersants is not particularly limited, and the dispersants may be appropriately added in suitable amounts.

1.2.5. Polymerization Inhibitors

The ink in this embodiment may contain a polymerization inhibitor. The presence of a polymerization inhibitor in the ink prevents the polymerization reaction of the polymerizable compounds before curing.

The polymerization inhibitors are not particularly limited. For example, phenolic polymerization inhibitors may be used. Examples of the phenolic polymerization inhibitors include, although not limited to, p-methoxyphenol, cresol, t-butylcatechol, di-t-butylparacresol, hydroquinone monomethyl ether, α-naphthol, 3,5-di-t-butyl-4-hydroxytoluene, 2,6-di-t-butyl-4-methylphenol, 2,2'-methylene-bis(4-methyl-6-t-butylphenol), 2,2'-methylene-bis(4-ethyl-6-butylphenol), and 4,4'-thio-bis(3-methyl-6-t-butylphenol).

Examples of commercially available phenolic polymerization inhibitors include p-methoxyphenol (manufactured by Tokyo Chemical Industry Co., Ltd., product name, p-methoxyphenol), NONFLEX MBP (manufactured by Seiko Chemical Co., Ltd., product name, 2,2'-methylene-bis(4-methyl-6-t-butylphenol)) and BHT SWANOX (manufactured by Seiko Chemical Co., Ltd., product name, 2,6-di-t-butyl-4-methylphenol).

The polymerization inhibitors may be used singly, or two or more may be used in combination. The content of the polymerization inhibitors is not particularly limited, and the polymerization inhibitors may be appropriately added in suitable amounts.

1.2.6. Surfactants

The UV curable ink in this embodiment may further contain a surfactant. The surfactants are not particularly limited. For example, silicone surfactants such as polyester-modified silicones and polyether-modified silicones may be used. It is particularly preferable to use polyether-modified polydimethylsiloxane or polyester-modified polydimethylsiloxane. Examples of commercially available slipping agents include BYK-347, BYK-348, and BYK-UV3500, 3510, 3530 and 3570 (manufactured by BYK).

The surfactants may be used singly, or two or more may be used in combination. The content of the surfactants is not particularly limited, and the surfactants may be appropriately added in suitable amounts.

1.2.7. Other Additives

The UV curable ink in this embodiment may contain additives (components) other than the aforementioned additives. Such components are not particularly limited. Examples include known polymerization accelerators, penetration enhancers, wetting agents (humectants), and further additives. Examples of the further additives include known fixing agents, mildew-proofing agents, preservatives, antioxidants, UV absorbers, chelating agents, pH adjusters and thickening agents.

The UV curable ink in this embodiment is preferably a nonaqueous UV curable ink. The term "nonaqueous UV curable ink" refers to a UV curable ink designed to be free from water. In detail, the content of water in the UV curable ink is preferably not more than 3 mass %, more preferably not more than 1 mass %, still more preferably less than 0.05 mass %, even more preferably less than 0.01 mass %, further preferably less than 0.005 mass %, and most preferably less than 0.001 mass %. Such an ink may be also referred to as a substantially water-free UV curable ink composition.

1.2.8. Properties of UV Curable Inks

Illumination Energy

When the UV curable inks described above are used, it is preferable to use such UV curable inks which are cured with illumination energy of not more than 1000 mJ/cm$^2$, more preferably not more than 300 mJ/cm$^2$, still more preferably not more than 200 mJ/cm$^2$, and particularly preferably not more than 100 mJ/cm$^2$ from the viewpoint that the power consumption by the illuminators may be saved.

Viscosity

The viscosity of the UV curable inks at 20° C. is preferably not more than 20 mPa·s, and is more preferably 4 mPa·s to 13 mPa·s, and still more preferably 7 mPa·s to 13 mPa·s. With this viscosity, the ink jet recorder may be used in a usual environment without the need of heating units, and consequently the ink jet recorder may be miniaturized or simplified. The viscosity of the UV curable inks may be measured with an E-type viscometer.

The viscosity of the UV curable inks at ejection from the head is preferably not more than 20 mPa·s, and is more preferably 4 mPa·s to 13 mPa·s, and still more preferably 7 mPa·s to 13 mPa·s. With this configuration in which the viscosity of the UV curable inks during ejection is not more than 20 mPa·s, the head of the ink jet recorder may achieve good ejection stability. When the viscosity of the UV curable inks during ejection is not less than 4 mPa·s, the occurrence of problems such as curing wrinkles on the recorded images may be reduced, and thus satisfactory images may be obtained. The viscosity of the UV curable inks may be measured with an E-type viscometer.

The temperature of the UV curable inks at the time of ejection from the head is preferably not more than 35° C., and more preferably not more than 30° C. The lower limit temperature is preferably 10° C. or above, more preferably 15° C. or above, and still more preferably 20° C. or above. In this case, the ink jet recorder may be appropriately placed in such an environment that the temperature of the UV curable inks will fall in the above range. The above temperature of the UV curable inks ensures that the viscosity of the UV curable inks during ejection will be easily maintained in the aforementioned preferred range.

In order to control the viscosity of the UV curable inks in the above range, the proportions of components in the ink may be appropriately adjusted. For example, the viscosity of the aforementioned UV curable inks may be controlled by controlling the proportions of the polymerizable compounds.

1.3. Recording Media

The ink jet recorder of this embodiment may be used for the recording on any types of recording media used in flat-bed ink jet recorders (such as papers, woven articles, knitted articles, nonwoven fabrics, leathers, resin films, resin sheets, glasses and metals). In particular, the ink jet recorder fitted with the aforementioned hot swapping mechanism may produce records on any of these recording media with satisfactory image quality with a reduced probability of failures such as misaligned images or variations in color tone. Thus, the inventive ink jet recorder may be suitably used even for the recording on expensive recording media (such as metals, acrylics and glasses) where a significant loss is incurred in the event of recording failure.

The recording medium used in the flat-bed ink jet recorder is a single sheet. For example, the length of the recording surface in the second direction when the sheet is supported on the panel of the support unit 10 may be not more than 4 m, particularly not more than 3 m and may be not less than 0.5 m, particularly not less than 1 m.

2. Examples

Hereinbelow, the embodiments of the first aspect of the invention will be described in further detail based on Examples. However, the embodiments are not limited to such Examples.

2.1. Evaluation of Inks

2.1.1. Preparation of Inks

Components described in Table 1 were mixed in the contents described in Table 1, and the mixtures were each stirred with a high-speed water-cooled stirrer to give UV curable inks (hereinafter, also referred to simply as "inks") 1 to 10. The components shown in Table 1 are the following.

Polymerizable Compounds
  VEEA (product name, 2-(2-vinyloxyethoxy)ethyl acrylate, manufactured by Nippon Shokubai Co., Ltd., monofunctional (meth)acrylate, hereinafter "VEEA")
  BISCOAT #192 (product name, phenoxyethyl acrylate, manufactured by Osaka Organic Chemical Industry Ltd., monofunctional (meth)acrylate, hereinafter "PEA")
  V #160 (product name, benzyl acrylate, manufactured by Osaka Organic Chemical Industry Ltd., monofunctional (meth)acrylate, hereinafter "BZA")
  IBXA (product name, isobornyl acrylate, manufactured by Osaka Organic Chemical Industry Ltd., monofunctional (meth)acrylate, hereinafter "IBX")
  SR508 (product name, dipropylene glycol diacrylate, difunctional (meth)acrylate, manufactured by Sartomer)
  A-DPH (product name, dipentaerythritol hexaacrylate, hexafunctional (meth)acrylate, manufactured by SHIN-NAKAMURA CHEMICAL CO., LTD., hereinafter "A-DPH")

Polymer
  BISCOAT #1000 (product name, manufactured by Osaka Organic Chemical Industry Ltd., hyperbranched polymer, viscosity: 273 mPa·s, number of acrylic groups: 14, hereinafter "V #1000")
  BISCOAT #1000 is a hyperbranched polymer in which functional groups are branched from dipentaerythritol as the core, and contains ethylene glycol diacrylate as a diluent monomer.

Photopolymerization Initiators
  IRGACURE 819 (product name, manufactured by BASF, solid content: 100%, hereinafter "819")
  DAROCUR TPO (product name, manufactured by Lambson, hereinafter "TPO")
  IRGACURE 369 (product name, manufactured by BASF, hereinafter "369")

Surfactant
  BYK-UV3500 (product name, manufactured by BYK, polyether-modified polydimethylsiloxane, hereinafter "BYK3500")

Coloring Material
  C.I. pigment black 7 (manufactured by Mitsubishi Chemical Corporation, Mitsubishi Carbon MA11, hereinafter "PB-7")

Dispersant
  Solsperse 32000 (product name, manufactured by Avecia Co., hereinafter "SOL32000")

Polymerization Inhibitor
  P-methoxyphenol (product name, manufactured by Tokyo Chemical Industry Co., Ltd., p-methoxyphenol, hereinafter "MEHQ")

TABLE 1

| Components | | Ink 1 | Ink 2 | Ink 3 | Ink 4 | Ink 5 | Ink 6 | Ink 7 | Ink 8 | Ink 9 | Ink 10 |
|---|---|---|---|---|---|---|---|---|---|---|---|
| Polymerizable compounds | VEEA | 50 | 20 | 87.7 | 77.7 | 82.7 | | 42.7 | 60 | 55 | 50 |
| | PEA | 30 | 30 | | | 5 | 42.7 | | | 15 | 30 |
| | BZA | | | | | | | | 20 | | |
| | IBX | | | | | | | | | 10 | |
| | SR508 | | 30 | | | | 45 | 45 | | | |
| | A-DPH | 7.7 | 7.7 | | | | | | 7.7 | 7.7 | 7.7 |
| Polymer | V#1000 | | | | 10 | | | | | | |
| Photopolymerization initiators | 819 | 4 | 4 | 4 | 4 | 4 | 4 | 4 | 4 | 4 | |
| | TPO | 5 | 5 | 5 | 5 | 5 | 5 | 5 | 5 | 5 | |
| | 369 | | | | | | | | | | 9 |
| Surfactant | BYK3500 | 0.2 | 0.2 | 0.2 | 0.2 | 0.2 | 0.2 | 0.2 | 0.2 | 0.2 | 0.2 |
| Coloring material | PB-7 | 2 | 2 | 2 | 2 | 2 | 2 | 2 | 2 | 2 | 2 |
| Dispersant | SOL32000 | 1 | 1 | 1 | 1 | 1 | 1 | 1 | 1 | 1 | 1 |
| Polymerization inhibitor | MEHQ | 0.1 | 0.1 | 0.1 | 0.1 | 0.1 | 0.1 | 0.1 | 0.1 | 0.1 | 0.1 |
| Total | | 100 | 100 | 100 | 100 | 100 | 100 | 100 | 100 | 100 | 100 |
| Evaluation results | Ranks of ink viscosity at 20° C. | 2 | 3 | 1 | 2 | 1 | 2 | 2 | 2 | 2 | 2 |
| | Storage stability | A | A | A | B | A | A | B | A | A | A |
| | Curability | A | A | A | C | A | C | C | A | B | C |

2.1.2. Ink Evaluation Tests
Viscosity Evaluation (Ranking of Ink Viscosity at 20° C.)

With a DVM-E-type rotational viscometer (manufactured by TOKYO KEIKI INC.), each of the inks prepared above was tested to determine the viscosity at 20° C. The rotor used was a DVM-E-type cone having a cone angle of 1°34' and a cone radius of 2.4 cm. The rotational speed was 10 rpm. The evaluation criteria were as follows. The evaluation results are described in Table 1.

1: Less than 7 mPa·s.
2: 7 mPa·s to 13 mPa·s.
3: More than 13 mPa·s.

Storage Stability Evaluation

Each of the inks prepared above was placed into a 50 cc volume glass bottle, and the bottle was tightly closed. Thereafter, the glass bottles were placed in a thermostatic chamber and were allowed to stand at 60° C. for 7 days. After 7 days, the glass bottles were removed and were allowed to cool sufficiently to room temperature. Subsequently, the viscosity was measured at 20° C. in the same manner as the above evaluation "ranking of ink viscosity at 20° C.". The rate of increase of the viscosity after the 7 days storage relative to the initial viscosity (immediately after preparation) was calculated. The evaluation criteria were as follows. The evaluation results are described in Table 1.

A: Not more than +5%.
B: More than +5%.

Ink Curability Evaluation

Each of the inks was applied onto LUMIRROR #125-E20 (product name, manufactured by TORAY INDUSTRIES, INC., PET film) with a bar coater manufactured by TESTER SANGYO CO., LTD. The thickness of the film after curing was 10 μm. Next, the ink was illuminated with UV radiation at a dose of 1,000 mW/cm$^2$ with an LED having a peak wavelength of 395 nm (Firefly (product name), manufactured by Phoseon) for a prescribed time to give a cured ink film. After the irradiation, the surface of the ink film was rubbed back and forth 20 times with a cotton swab manufactured by Johnson & Johnson K.K. under a load of 130 g. The illumination energy required for the ink film to be free from abrasion marks was measured. The evaluation criteria were as follows. The evaluation results are described in Table 1.

A: Not more than 200 mJ/cm$^2$.
B: More than 200 mJ/cm$^2$ to 300 mJ/cm$^2$.
C: More than 300 mJ/cm$^2$.

2.1.3. Ink Evaluation Results

The results of the above ink evaluations are collectively set forth in Table 1.

As described in Table 1, it has been demonstrated that both excellent storage stability and excellent curability were achieved by the inks 1, 2, 8 and 9 which contained a vinyl ether group-containing (meth)acrylic acid ester of General Formula (I) and a monofunctional (meth)acrylate other than the vinyl ether group-containing (meth)acrylic acid ester and which had a viscosity at 20° C. of not less than 7 mPa·s.

Further, as described in Table 1, the ink 2 has been demonstrated to have high viscosity at 20° C., and the inks 3 and 5 have been shown to have low viscosity at 20° C. Thus, it has been shown that the ink viscosity is variable in accordance with the proportions of polymerizable compounds.

From the evaluation results of the curability of the ink 1 and the ink 9 in Table 1, it has been demonstrated that the ink curability is enhanced by the use of an acylphosphine oxide compound as the photopolymerization initiator.

2.2. Evaluation of Ink Jet Recorders
2.2.1. Preparation of Recorders

Prior to the testing of recorders, the following recorders 1 to 6 were prepared. The recorders 1 to 3 were made by modifying GS6000 (product name, manufactured by SEIKO EPSON CORPORATION, large format printer) in such a manner that the stand and the recording medium transport device were removed, and wheels and a drive unit were attached to the remaining body to form a mobile unit, which was then movably mounted on a support unit. The mobile unit was configured to be moved on their wheels on the support unit in the second direction by driving of the drive unit. The mobile unit had maintenance units (a cap for tightly closing the head, a vacuum pump for suctioning the ink in the head, and a wiper for wiping the nozzle face of the head) at one end in the head travel direction (the first direction), as well as had an ink tray on the other end for receiving the ink pushed out by flushing. The total mass of the maintenance units mounted on the mobile unit was 3 kg (except in the recorders 4 and 5 described later). Further, a notebook computer for creating print data was mounted on the cabinet of the mobile unit (see FIG. 2).

The length of a supply tube (an ink supply tube) connecting the ink cartridge to the head was 6 m in the recorder 3 and was 3 m in the other recorders.

Recorder 1

In the recorder 1, two identical color ink cartridges were mounted on the mobile unit (namely, the hot swapping function was added).

Recorder 2

In the recorder 2, one ink cartridge was mounted on the mobile unit (namely, the hot swapping function was not added).

Recorder 3

In the recorder 3, two identical color ink cartridges were mounted on the support unit (namely, the hot swapping function was added, but the ink cartridges were not moved together with the mobile unit).

Recorder 4

The recorder 4 was GS6000 on which two identical color ink cartridges were mounted (namely, the recorder was a usual large format printer which had the hot swapping function but did not include any mobile unit or support unit).

Recorder 5

The recorder 5 was prepared by removing the maintenance units from the mobile unit in the recorder 1 and attaching them to the outside of the support unit in the first direction.

Recorder 6

The recorder 6 was similar to the recorder 1, except that the notebook computer for creating print (image) data was not mounted on the mobile unit but was placed on a desk disposed aside the support unit, and consequently the mobile unit was connected to the notebook computer via a longer wire cord (a USB cable) than in the recorder 1.

Illuminators

Further, the following illuminators 1 to 3 were selected and mounted on the recorders 1 to 6 according to the combinations described in Tables 2 and 3.

The illuminators 1 included illuminators A for preliminary curing disposed at both ends of the head in the first direction, and illuminators B for main curing disposed on the second direction sides of the head so as to illuminate along the width direction of the recording medium. In all the illuminators A and B, the illumination intensity was 1000 mW/cm$^2$ and the light sources were UV emitting diodes.

The configuration of the illuminators 2 was similar to the illuminators 1, except that the illumination intensity was 500 mW/cm$^2$.

The configuration of the illuminators 3 was similar to the illuminators 1, except that the UV emitting diodes were replaced by metal halide lamps.

Inks

The inks prepared as described hereinabove were added to ink cartridges, which were then mounted on the recorders as described in Tables 2 and 3.

2.2.2. Evaluation of Recorders

Printing Continuity Performance

The ink was supplied to the head from the ink cartridge mounted on the recorder. As mentioned earlier, two identical color ink cartridges were mounted on the recorders 1, 3, 4, 5 and 6, whilst one ink cartridge was mounted on the recorder 2. A recording medium, which was an acrylic sheet having an area described in Table 2 or 3, was set onto the panel of the support unit.

Recording was then started to produce a 1.1×2.3 m$^2$ solid pattern image. In Example in which the recording medium had an area of 2.1×3.5 m$^2$, a 2.0×3.5 m$^2$ solid pattern image was recorded. In Example which involved the recorder 4, a roll of flexible vinyl chloride paper was set and a 1.1×6.9 m$^2$ continuous pattern was recorded. The thickness of the ink film after the printing of the solid pattern was 10 μm. After the solid pattern image was recorded, a new sheet of the recording medium was set onto the stage. These operations were repeated to produce similar records on fifty sheets of the recording medium. When one of the cartridges had become empty when a new sheet of the recording medium was set, the empty cartridge was replaced by the new cartridge. In this manner, the printing continuity performance was evaluated. The evaluation criteria were as follows. The evaluation results are described in Tables 2 and 3.

Here, the term "solid pattern image" refers to an image pattern which should be usually such that the recording region of the recording medium has been filled in with the ink and consequently the true character of the recording medium is hidden by the recording of ink dots for all the pixels which are the smallest recording units defined in terms of recording resolution.

A: The first cartridge lasted until the images were recorded on thirty sheets of the recording medium. Because of the hot swapping function, every sheet of the recording medium was printed without any interruption of the ink supply during the recording.

B: The cartridges were exchanged before the image was recorded on the 30th or earlier sheet of the recording medium. Because of the hot swapping function, every sheet of the recording medium was printed without any interruption of the ink supply during the recording.

C: The ink in the cartridge was spent during the recording on any one sheet of the recording medium, and the printing had to be interrupted for the exchange of cartridges.

Cleaning Properties

The ink was supplied to the head from the ink cartridge mounted on the recorder. After the head was filled with the ink, the cartridge was removed and the ink was suctioned through the head to empty the ink supply tube. Thereafter, a cartridge containing a cleaning solution (diethylene glycol ethyl ether acetate) was attached, and the cleaning solution was suctioned from the head and was discharged through the head. The transmittance was measured with respect to every 5 cc of the cleaning solution discharged from the head, and the amount of the discharged cleaning solution was accumulated until the transmittance of the discharged cleaning solution reached 98% or more of the transmittance of the cleaning solution in the cartridge before cleaning. In this manner, cleaning properties were evaluated. The transmittance was measured with a spectrophotometer (product name "U-3300", manufactured by Hitachi, Ltd.) with respect to the discharged cleaning solution diluted 1000 times by the addition of distilled water. The evaluation criteria were as follows. The evaluation results are described in Tables 2 and 3.

○: Not more than 300 cc.

x: More than 300 cc.

Fill-in properties in solid pattern image (solid fill evaluation)

On a PET film (product name "LUMIRROR125 E20", manufactured by TORAY INDUSTRIES, INC.) as the recording medium, 11 ng/pixel dots were formed and cured, thereby recording a solid pattern image having a recording resolution of 720 dpi×720 dpi and a dimension (size) of 20 cm×20 cm. The pixels are the smallest recording units defined in terms of recording resolution. During recording, the main scanning (pass) was performed in which the ink was ejected from the head while the carriage on which the head was mounted was moved in the first direction, and the ink deposited on the recording medium was illuminated with illumination energy of 50 mJ/cm$^2$ per pass. After the main scanning, the ink was illuminated several times by moving the carriage in the first direction until the total of illumination energy per unit area of the recording medium reached 1000 mJ/cm$^2$. The recording medium was then visually inspected from a distance of 30 cm to determine whether or not the dots in the solid pattern image region failed to hide any portion of the recording surface. The evaluation criteria were as follows. The evaluation results are described in Tables 2 and 3.

A: The recording surface was not visible.

B: The recording surface was visible.

Curing Wrinkles

The solid pattern images obtained in the above evaluation "Fill-in properties in solid pattern image" were used. Each solid pattern image was analyzed with laser microscope VK-9700 (manufactured by KEYENCE) to determine the root mean square height (Rq). Further, the surface of the solid pattern image was visually observed. The evaluation criteria were as follows. The evaluation results are described in Tables 2 and 3.

A: Rq was not more than 4. The solid pattern image had gloss on the surface.

B: Rq was more than 4 and not more than 6. The solid pattern image had slight gloss on the surface.

C: Rq was more than 6. The solid pattern image did not show gloss on the surface.

2.2.3. Recorder Evaluation Results

The results of the recorder evaluation tests are described in Tables 2 and 3.

TABLE 2

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Recorder configuration | Ink used | 1 | 1 | 1 | 1 | 2 | 1 | 10 | 4 | 6 |
|  | Recorder used | 1 | 1 | 1 | 1 | 1 | 1 | 1 | 1 | 1 |
|  | Illuminators used | 1 | 1 | 1 | 1 | 1 | 1 | 3 | 1 | 1 |
|  | Initial volume in ink container (ml) | 700 | 300 | 2000 | 700 | 700 | 700 | 700 | 700 | 700 |
| Recording medium area (m × m) |  | 1.2 × 2.4 | 1.2 × 2.4 | 1.2 × 2.4 | 2.1 × 3.5 | 1.2 × 2.4 | 1.2 × 2.4 | 1.2 × 2.4 | 1.2 × 2.4 | 1.2 × 2.4 |
| Ink temperature during ejection |  | 25° C. | 25° C. | 25° C. | 25° C. | 35° C. | 30° C. | 25° C. | 25° C. | 25° C. |
| Ranks of ink viscosity during ejection |  | 2 | 2 | 2 | 2 | 2 | 2 | 2 | 2 | 2 |
| Evaluation results | Cleaning properties | ○ | ○ | ○ | ○ | ○ | ○ | ○ | ○ | ○ |
|  | Printing continuity performance | A | B | A | B | A | A | A | A | A |
|  | Solid fill evaluation (solid pattern) | A | A | A | A | B | A | A | A | A |
|  | Curing wrinkles | A | A | A | A | A | A | A | B | A |

|  |  | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Recorder configuration | Ink used | 7 | 8 | 9 | 3 | 5 | 1 | 1 | 1 |
|  | Recorder used | 1 | 1 | 1 | 1 | 1 | 1 | 5 | 6 |
|  | Illuminators used | 1 | 1 | 1 | 1 | 1 | 2 | 1 | 1 |
|  | Initial volume in ink container (ml) | 700 | 700 | 700 | 700 | 700 | 700 | 700 | 700 |
| Recording medium area (m × m) |  | 1.2 × 2.4 | 1.2 × 2.4 | 1.2 × 2.4 | 1.2 × 2.4 | 1.2 × 2.4 | 1.2 × 2.4 | 1.2 × 2.4 | 1.2 × 2.4 |
| Ink temperature during ejection |  | 25° C. | 25° C. | 25° C. | 25° C. | 25° C. | 25° C. | 25° C. | 25° C. |
| Ranks of ink viscosity during ejection |  | 2 | 2 | 2 | 1 | 1 | 2 | 2 | 2 |
| Evaluation results | Cleaning properties | ○ | ○ | ○ | ○ | ○ | ○ | ○ | ○ |
|  | Printing continuity performance | A | A | A | A | A | A | A | A |
|  | Solid fill evaluation (solid pattern) | A | A | A | A | A | A | A | A |
|  | Curing wrinkles | A | A | A | C | C | C | A | A |

TABLE 3

|  |  | Comp. Ex. 1 | Comp. Ex. 2 | Comp. Ex. 3 | Ref. Ex. 1 | Ref. Ex. 2 | Ref. Ex. 3 |
|---|---|---|---|---|---|---|---|
| Recorder configuration | Ink used | 1 | 1 | 1 | 1 | 10 | 2 |
|  | Recorder used | 2 | 2 | 3 | 4 | 1 | 1 |
|  | Illuminators used | 1 | 1 | 1 | 1 | 1 | 1 |
|  | Initial volume in ink container (ml) | 700 | 1000 | 700 | 700 | 700 | 700 |
| Recording medium area (m × m) |  | 1.2 × 2.4 | 1.2 × 2.4 | 1.2 × 2.4 | 1.2 × 2.4 | 1.2 × 2.4 | 1.2 × 2.4 |
| Ink temperature during ejection |  | 25° C. | 25° C. | 25° C. | 25° C. | 25° C. | 30° C. |
| Ranks of ink viscosity during ejection |  | 2 | 2 | 2 | 2 | 2 | 3 |
| Evaluation results | Cleaning properties | ○ | ○ | X | ○ | ○ | — |
|  | Printing continuity performance | C | C | B | A | — | — |
|  | Solid fill evaluation (solid pattern) | A | A | A | A | — | — |
|  | Curing wrinkles | A | A | A | A | — | — |

As shown in the evaluation results in Table 2, the recorders in Examples achieved good printing (recording) continuity performance because of having the hot swapping function. Further, the hot swapping function reduced the occurrence of image failures such as misaligned images or variations in color tone. Furthermore, because the recorders in Examples had the ink cartridges mounted on the mobile unit, the length of the ink supply tubes connecting the ink cartridges to the head was short and consequently the amount of the cleaning solution used was saved.

In more detail, Example 2 required frequent exchanges of ink cartridges because the ink cartridges used had small volumes, but the hot swapping function allowed every sheet of the recording medium to be printed without any interruption of the ink supply during the recording.

Example 3 involved large-volume ink cartridges. As a result, a high load was incurred for the movement of the mobile unit because of the weight increase of the mobile unit.

In Example 4, the recording medium used had a large area of the recording surface, and consequently the ink cartridge exchange frequency was increased.

In Example 5, the ink had a high viscosity and was used after being heated with a heater. As a result, the weight of the mobile unit was increased and a high load was incurred for the movement of the mobile unit. The decrease in fill-in properties was probably because the ink viscosity was increased after ejection from the head.

Example 6 involved metal halide lamps as the illumination devices. As a result, the weight of the mobile unit was increased by the installation of illuminator cooling devices, and a high load was incurred for the movement of the mobile unit. Further, the recording medium had been thermally deformed by heating with the metal halide lamps.

In Examples 13 and 14, the occurrence of curing wrinkles tended to be marked because of the low viscosity of the ink used.

In Example 15, the occurrence of curing wrinkles tended to be marked because of the low illumination intensity.

In Example 16, the maintenance units were not mounted on the mobile unit and thus failed to perform the flushing operation during the recording on any one sheet of the recording medium. Because the maintenance units were disposed under constant light irradiation outside the gantry cabinet, the discharged ink which had become attached to the cap and the ink tray increased its viscosity and was resistant to removal.

A similar configuration as in Example 1 was produced, except that auxiliary maintenance units were further mounted on the mobile unit as a backup that performs the maintenance of the head in case of breakdown of the maintenance units. The total mass of the maintenance units was 6 kg, and the mobile unit could not be moved because of such a heavy load for the movement of the mobile unit.

In Example 17, the notebook computer was not mounted on the mobile unit and thus was connected to the mobile unit via a long wire cord (a USB cable). This configuration resulted in a necessity that the wires be disposed at a position permitting a smooth operation.

As described in Table 3, the recorders in Comparative Examples 1 and 2 did not have the hot swapping function and were unsatisfactory in printing (recording) continuity performance. Further, the recorded images had problems such as misalignment or varied color tone.

Although the recorder in Comparative Example 3 had the hot swapping function, the mobile unit did not carry any ink cartridges and thus the ink supply tubes connecting the ink cartridges to the head were long. Consequently, as described in Table 3, cleaning of the ink supply channels required a large amount of the cleaning solution.

The recorder in Reference Example 1 failed to perform printing on hard recording media such as acrylic sheets.

The recorders used in Reference Examples 2 and 3 performed well, but the implementation of the evaluations was infeasible due to the inks used. Specifically, the ink in Reference Example 2 did not cure, and the ink in Reference Example 3 could not be ejected due to such a high viscosity.

The invention is not limited to these embodiments described hereinabove, and various modifications are possible. For example, the scope of the invention includes configurations substantially identical to those described in the embodiments (for example, configurations having the same functions, approaches and results, or configurations having the same objects and effects). Further, the scope of the invention includes configurations resulting from the substitution of non-essential components in the aforementioned embodiments with other components. Furthermore, the scope of the invention includes configurations that achieve the same effects or the same objects as the configurations described in the embodiments. The scope of the invention also includes combinations of the configurations described in the aforementioned embodiments and known configurations.

2. Examples

Hereinbelow, the embodiments of the second aspect of the invention will be described in further detail based on Examples. However, the embodiments are not limited to such Examples.

2.1. Evaluation of Inks 2.1.1. Preparation of Inks

Components described in Table 4 were mixed in the contents described in Table 4, and the mixtures were each stirred with a high-speed water-cooled stirrer to give UV curable inks (hereinafter, also referred to simply as "inks") 1 to 11. The components shown in Table 4 are the following.

Polymerizable Compounds
- VEEA (product name, 2-(2-vinyloxyethoxy)ethyl acrylate, manufactured by Nippon Shokubai Co., Ltd., monofunctional (meth)acrylate, hereinafter "VEEA")
- BISCOAT #192 (product name, phenoxyethyl acrylate, manufactured by Osaka Organic Chemical Industry Ltd., monofunctional (meth)acrylate, hereinafter "PEA")
- V #160 (product name, benzyl acrylate, manufactured by Osaka Organic Chemical Industry Ltd., monofunctional (meth)acrylate, hereinafter "BZA")
- IBXA (product name, isobornyl acrylate, manufactured by Osaka Organic Chemical Industry Ltd., monofunctional (meth)acrylate, hereinafter "IBX")
- SR508 (product name, dipropylene glycol diacrylate, difunctional (meth)acrylate, manufactured by Sartomer)
- A-DPH (product name, dipentaerythritol hexaacrylate, hexafunctional (meth)acrylate, manufactured by SHIN-NAKAMURA CHEMICAL CO., LTD., hereinafter "A-DPH")

Polymer
- BISCOAT #1000 (product name, manufactured by Osaka Organic Chemical Industry Ltd., hyperbranched polymer, viscosity: 273 mPa·s, number of acrylic groups: 14, hereinafter "V #1000")

BISCOAT #1000 is a hyperbranched polymer in which functional groups are branched from dipentaerythritol as the core, and contains ethylene glycol diacrylate as a diluent monomer.

Photopolymerization Initiators
- IRGACURE 819 (product name, manufactured by BASF, solid content: 100%, hereinafter "819")
- DAROCUR TPO (product name, manufactured by Lambson, hereinafter "TPO")
- IRGACURE 369 (product name, manufactured by BASF, hereinafter "369")

Surfactant
- BYK-UV3500 (product name, manufactured by BYK, polyether-modified polydimethylsiloxane, hereinafter "BYK3500")

Coloring Material
- C.I. pigment black 7 (manufactured by Mitsubishi Chemical Corporation, Mitsubishi Carbon MA11, hereinafter "PB-7")

Dispersant
- Solsperse 32000 (product name, manufactured by Avecia Co., hereinafter "SOL32000")

Polymerization Inhibitor
- P-methoxyphenol (product name, manufactured by Tokyo Chemical Industry Co., Ltd., p-methoxyphenol, hereinafter "MEHQ")

TABLE 4

| | Components | Ink 1 | Ink 2 | Ink 3 | Ink 4 | Ink 5 | Ink 6 | Ink 7 | Ink 8 | Ink 9 | Ink 10 | Ink 11 |
|---|---|---|---|---|---|---|---|---|---|---|---|---|
| Polymerizable compounds | VEEA | 50 | 87.7 | 77.7 | 82.7 | | 42.7 | 60 | 55 | 50 | 40 | 7 |
| | PEA | 30 | | | 5 | 42.7 | | | 15 | 30 | 10 | 54.7 |
| | BZA | | | | | | | 20 | | | | |
| | IBX | | | | | | | | 10 | | | |
| | SR508 | | | | | 45 | 45 | | | | 29.7 | 26 |
| | A-DPH | 7.7 | | | | | | 7.7 | 7.7 | 7.7 | 8 | |
| Polymer | V#1000 | | | 10 | | | | | | | | |
| Photopolymerization initiators | 819 | 4 | 4 | 4 | 4 | 4 | 4 | 4 | 4 | | 4 | 4 |
| | TPO | 5 | 5 | 5 | 5 | 5 | 5 | 5 | 5 | | 5 | 5 |
| | 369 | | | | | | | | | 9 | | |
| Surfactant | BYK3500 | 0.2 | 0.2 | 0.2 | 0.2 | 0.2 | 0.2 | 0.2 | 0.2 | 0.2 | 0.2 | 0.2 |
| Coloring material | PB-7 | 2 | 2 | 2 | 2 | 2 | 2 | 2 | 2 | 2 | 2 | 2 |
| Dispersant | SOL32000 | 1 | 1 | 1 | 1 | 1 | 1 | 1 | 1 | 1 | 1 | 1 |
| Polymerization inhibitor | MEHQ | 0.1 | 0.1 | 0.1 | 0.1 | 0.1 | 0.1 | 0.1 | 0.1 | 0.1 | 0.1 | 0.1 |
| Total | | 100 | 100 | 100 | 100 | 100 | 100 | 100 | 100 | 100 | 100 | 100 |
| Evaluation results | Ranks of ink viscosity at 20° C. | 2 | 1 | 2 | 1 | 2 | 2 | 2 | 2 | 2 | 3 | 4 |
| | Storage stability | A | A | B | A | A | B | A | A | A | B | A |
| | Curability | A | A | C | A | C | C | A | B | C | A | B |

2.1.2. Ink Evaluation Tests

Viscosity Evaluation (Ranking of Ink Viscosity at 20° C.)

With a DVM-E-type rotational viscometer (manufactured by TOKYO KEIKI INC.), each of the inks prepared above was tested to determine the viscosity at 20° C. The rotor used was a DVM-E-type cone having a cone angle of 1°34' and a cone radius of 2.4 cm. The rotational speed was 10 rpm. The evaluation criteria were as follows. The evaluation results are described in Table 4.

1: Less than 7 mPa·s.
2: 7 mPa·s to 13 mPa·s.
3: More than 13 mPa·s to 20 mPa·s.
4: More than 20 mPa·s.

Storage Stability Evaluation

Each of the inks prepared above was placed into a 50 cc volume glass bottle, and the bottle was tightly closed. Thereafter, the glass bottles were placed in a thermostatic chamber and were allowed to stand at 60° C. for 7 days. After 7 days, the glass bottles were removed and were allowed to cool sufficiently to room temperature. Subsequently, the viscosity was measured at 20° C. in the same manner as the above evaluation "ranking of ink viscosity at 20° C.". The rate of increase of the viscosity after the 7 days storage relative to the initial viscosity (immediately after preparation) was calculated. The evaluation criteria were as follows. The evaluation results are described in Table 4.

A: Not more than +5%.
B: More than +5%.

Ink Curability Evaluation

Each of the inks was applied onto LUMIRROR #125-E20 (product name, manufactured by TORAY INDUSTRIES, INC., a PET film) with a bar coater manufactured by TESTER SANGYO CO., LTD. The thickness of the film after curing was 10 μm. Next, the ink was illuminated with UV radiation at a dose of 1,000 mW/cm$^2$ with an LED having a peak wavelength of 395 nm (Firefly (product name), manufactured by Phoseon) for a prescribed time to give a cured ink film. After the irradiation, the surface of the ink film was rubbed back and forth 20 times with a cotton swab manufactured by Johnson & Johnson K.K. under a load of 130 g. The illumination energy required for the ink film to be free from abrasion marks was measured. The evaluation criteria were as follows. The evaluation results are described in Table 4.

A: Not more than 200 mJ/cm$^2$.
B: More than 200 mJ/cm$^2$ to 300 mJ/cm$^2$.
C: More than 300 mJ/cm$^2$.

2.1.3. Ink Evaluation Results

The results of the above ink evaluations are collectively set forth in Table 4.

As described in Table 4, it has been demonstrated that both excellent storage stability and excellent curability were achieved by the inks 1, 7, 8, 10 and 11 which contained a vinyl ether group-containing (meth)acrylate of General Formula (I), a monofunctional (meth)acrylate other than the vinyl ether group-containing (meth)acrylate, and an acylphosphine oxide compound and which had a viscosity at 20° C. of not less than 7 mPa·s.

From the viscosity evaluation results, the viscosity at 20° C. of the inks 2 and 4 was low, and the viscosity at 20° C. of the inks 10 and 11 was high. Thus, it has been shown that the ink viscosity is variable in accordance with the proportions of polymerizable compounds.

From the evaluation results of the curability of the ink 1 and the ink 9, it has been demonstrated that the ink curability with LED illumination is enhanced by the use of an acylphosphine oxide compound as the photopolymerization initiator.

2.2. Evaluation of Ink Jet Recorders 2.2.1. Preparation of Recorders

Prior to the testing of recorders, the following recorders 1 to 6 were prepared. The recorders 1 to 3 were made by modifying GS6000 (product name, manufactured by SEIKO EPSON CORPORATION, large format printer) in such a manner that the stand and the recording medium transport device were removed, and illuminators described later, wheels and a drive unit were attached to the remaining body to form a mobile unit, which was then movably mounted on a support unit. The mobile unit was configured to be moved on their wheels on the support unit in the second direction by driving of the drive unit. The mobile unit had maintenance units (a cap for tightly closing the head, a vacuum pump for suctioning the ink in the head, and a wiper for wiping the nozzle face of the head) at one end in the head travel direction (the first direction), as well as had an ink tray on the other end for receiving the ink pushed out by flushing. The total mass of the maintenance units mounted on the mobile unit was 3 kg (except in the recorder 5 described later). Further, a notebook computer for creating print data was mounted on the cabinet of the mobile unit (see FIG. 2, except in the recorder 6 described later).

The length of a supply tube (an ink supply tube) connecting the ink cartridge to the head was 6 m in the recorder 3 and was 3 m in the other recorders.

Recorder 1

In the recorder 1, an ink cartridge was mounted on the mobile unit. Further, any heating units were not mounted on the recorder 1 (namely, no heating units were mounted at any locations in the recorder 1 including the mobile unit).

Recorder 2

In the recorder 2, an ink cartridge and a heating unit were mounted on the mobile unit. In detail, temperature control medium go and return channels were disposed as the heating unit adjacent to the ink supply tube extending from the cartridge to the head. Diethylene glycol was circulated through the temperature control medium circulating channels. A temperature control medium tank was disposed in the temperature control medium circulating channels, and a heater was fitted to the tank to heat the temperature control medium. Thus, the heating unit was configured such that the ink running through the ink supply tube would be heated by the temperature control medium in the adjacent temperature control medium circulating channels, and the temperature was controlled with a heater controller such that the temperature of the ink being ejected from the head would be a temperature described in the table. The heating unit was disposed on the mobile unit except on the head. A separate head heater was attached in the head.

Recorder 3

In the recorder 3, an ink cartridge was mounted on the support unit (namely, the ink cartridge was not moved together with the mobile unit). Further, any heating units were not mounted on the recorder 3 (namely, no heating units were mounted at any locations in the recorder 3 including the mobile unit).

Recorder 4

The recorder 4 was GS6000 without modification except that illuminators were mounted thereon (namely, the recorder was a usual large format printer which did not include any mobile unit or support unit). Further, any heating units were not mounted on the recorder 4.

Recorder 5

The recorder 5 was prepared by removing the maintenance units from the mobile unit in the recorder 1 and attaching them to the outside of the support unit in the first direction.

Recorder 6

The recorder 6 was similar to the recorder 1, except that the notebook computer for creating print (image) data was not mounted on the mobile unit but was placed on a desk disposed aside the support unit, and consequently the mobile unit was connected to the notebook computer via a longer wire cord (a USB cable) than in the recorder 1.

Illuminators

The following illuminators 1 to 3 were selected and mounted on the recorders 1 to 6 according to the combinations described in Tables 5 and 6.

The illuminators 1 were disposed on the carriage, and included illuminators A for preliminary curing that were disposed at both ends of the head in the first direction, and illuminators B for main curing that were disposed on the second direction sides of the head so as to illuminate along the width direction of the recording medium. In all the illuminators A and B, the illumination intensity was 1000 mW/cm$^2$ and the light sources were UV emitting diodes.

The configuration of the illuminators 2 was similar to the illuminators 1, except that the illumination intensity was 500 mW/cm$^2$.

The configuration of the illuminators 3 was similar to the illuminators 1, except that the UV emitting diodes were replaced by metal halide lamps.

Inks

The inks prepared as described hereinabove were added to ink cartridges, which were then mounted on the recorders as described in Tables 5 and 6.

2.2.2. Evaluation of Recorders

The recorders were subjected to the following evaluations. In each evaluation test, the recorders were placed in a laboratory controlled at a prescribed temperature. However, in Comparative Example 3, the ink temperature was adjusted with the heater in the recorder. To determine the temperature of the ink being ejected from the head, the temperature of the nozzle plate was measured with a thermometer (a thermocouple) immediately before the start of recording and was taken as the ink temperature.

Further, the ink viscosity during ejection was measured in the same manner as in the above "Viscosity evaluation", except that the viscosity measurement temperature was the temperature of the ink being ejected. The thus-measured ink viscosity during ejection was ranked according to the similar evaluation criteria as in the "Viscosity evaluation", the results being described in Tables 5 and 6.

Ejection Stability

After the ink was supplied to the head from the ink cartridge mounted on the recorder, printing was started and the ink was continuously ejected through 360 nozzles of the head for 5 minutes. After 5 minutes, the printing was discontinued. Ejection stability was evaluated based on the number of nozzles that had become non-functioning in ink ejection (failed nozzles). The evaluation criteria were as follows. The evaluation results are described in Tables 5 and 6.

○: Five or less failed nozzles.

Δ: Six to ten failed nozzles.

x: Eleven or more failed nozzles.

Cleaning Properties

The ink was supplied to the head from the ink cartridge mounted on the recorder. After the head was filled with the ink, the cartridge was removed and the ink was suctioned through the head to empty the ink supply tube. Thereafter, a cartridge containing a cleaning solution (diethylene glycol ethyl ether acetate) was attached, and the cleaning solution was suctioned from the head and was discharged through the head. The transmittance was measured with respect to every 5 cc of the cleaning solution discharged from the head, and the amount of the discharged cleaning solution was accumulated until the transmittance of the discharged cleaning solution reached 98% or more of the transmittance of the cleaning solution in the cartridge before cleaning. In this manner, cleaning properties were evaluated. The transmittance was measured with a spectrophotometer (product name "U-3300", manufactured by Hitachi, Ltd.) with respect to the discharged cleaning solution diluted 1000 times by the addition of distilled water. The evaluation criteria were as follows. The evaluation results are described in Tables 5 and 6.

○: Not more than 300 cc.

x: More than 300 cc.

Fill-in properties in solid pattern image (solid fill evaluation)

On a recording medium (product name "LUMIRROR 125 E20", manufactured by TORAY INDUSTRIES, INC., a PET film), 11 ng/pixel dots were formed and cured, thereby recording a solid pattern image having a recording resolution of 720 dpi×720 dpi and a dimension (size) of 20 cm×20 cm.

The pixels are the smallest recording units defined in terms of recording resolution. During recording, the main scanning (pass) was performed in which the ink was ejected from the head while the carriage on which the head was mounted was moved in the first direction, and the ink deposited on the recording medium was illuminated with illumination energy of 50 mJ/cm$^2$ per pass. After the main scanning, the ink was illuminated several times by moving the carriage in the first direction until the total of illumination energy per unit area of the recording medium reached 1000 mJ/cm$^2$. The recording medium was then visually inspected from a distance of 30 cm to determine whether or not the dots in the solid pattern image region failed to hide any portion of the recording surface. The evaluation criteria were as follows. The evaluation results are described in Tables 5 and 6.

Here, the term "solid pattern image" refers to an image pattern which should be usually such that the recording region of the recording medium has been filled in with the ink and consequently the true character of the recording medium is hidden by the recording of ink dots for all the pixels which are the smallest recording units defined in terms of recording resolution.

A: The recording surface was not visible.
  B: The recording surface was visible.
Curing Wrinkles The solid pattern images obtained in the above evaluation "Fill-in properties in solid pattern image" were used. Each solid pattern image was analyzed with laser microscope VK-9700 (manufactured by KEYENCE) to determine the root mean square height (Rq). Further, the surface of the solid pattern image was visually observed. The evaluation criteria were as follows. The evaluation results are described in Tables 5 and 6.

A: Rq was not more than 4. The solid pattern image had gloss on the surface.
  B: Rq was more than 4 and not more than 6. The solid pattern image had slight gloss on the surface.
  C: Rq was more than 6. The solid pattern image did not show gloss on the surface.

Weight Reduction of Mobile Unit

To evaluate the weight reduction of the mobile unit, the masses of the mobile units in the recorders used in Examples and Comparative Examples were compared with the mass of the mobile unit in the recorder 1 used in Example 1 as the standard. In detail, the difference "Y−X (kg)" was calculated wherein X was the mass (kg) of the mobile unit in the recorder 1 used in Example 1 and Y was the mass (kg) of the mobile unit used in any of Examples and Comparative Examples. The evaluation criteria were as follows. The evaluation results are described in Tables 5 and 6.

⊙: Y−X<−1
  ○: −1≤Y−X≤1
  Δ: 1<Y−X≤5
  x: 5<Y−X 2.2.3. Recorder Evaluation Results The results of the recorder evaluation tests are described in Tables 5 and 6.

TABLE 5

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|---|
| Recorder configuration | Ink used | 1 | 1 | 2 | 3 | 4 | 5 | 6 | 7 | 8 | 9 | 9 | 10 | 1 | 1 | 1 | 1 |
| | Recorder used | 1 | 3 | 1 | 1 | 1 | 1 | 1 | 1 | 1 | 1 | 1 | 1 | 1 | 1 | 5 | 6 |
| | Illuminators used | 1 | 1 | 1 | 1 | 1 | 1 | 1 | 1 | 1 | 1 | 3 | 1 | 1 | 2 | 1 | 1 |
| Ink temperature during ejection | | 25° C. | 25° C. | 25° C. | 25° C. | 25° C. | 25° C. | 25° C. | 25° C. | 25° C. | 25° C. | 25° C. | 30° C. | 30° C. | 25° C. | 25° C. | 25° C. |
| Ranks of ink viscosity during ejection | | 2 | 2 | 1 | 2 | 1 | 2 | 2 | 2 | 2 | 2 | 2 | 3 | 2 | 2 | 2 | 2 |
| Evaluation results | Ejection stability | ○ | ○ | ○ | ○ | ○ | ○ | ○ | ○ | ○ | ○ | ○ | Δ | ○ | ○ | ○ | ○ |
| | Cleaning properties | ○ | X | ○ | ○ | ○ | ○ | ○ | ○ | ○ | ○ | ○ | ○ | ○ | ○ | ○ | ○ |
| | Solid fill evaluation (solid pattern) | A | A | A | A | A | A | A | A | A | — | A | A | A | A | A | A |
| | Curing wrinkles | A | A | C | B | C | A | A | A | A | — | A | A | A | C | A | A |
| | Weight reduction of mobile unit | ○ | ⊙ | ○ | ○ | ○ | ○ | ○ | ○ | ○ | ○ | ○ | Δ | ○ | ○ | ⊙ | ○ |

TABLE 6

| | | Comp. Ex. 1 | Comp. Ex. 2 | Comp. Ex. 3 |
|---|---|---|---|---|
| Recorder configuration | Ink used | 1 | 11 | 11 |
| | Recorder used | 4 | 2 | 2 |
| | Illuminators used | 1 | 1 | 1 |
| Ink temperature during ejection | | 25° C. | 25° C. | 45° C. |
| Ranks of ink viscosity during ejection | | 2 | 4 | 2 |
| Evaluation results | Ejection stability | ○ | X | ○ |
| | Cleaning properties | ○ | — | ○ |
| | Solid fill evaluation (solid pattern) | A | — | B |
| | Curing wrinkles | A | — | A |
| | Weight reduction of mobile unit | — | X | X |

As shown in the evaluation results in Table 5, the recorders in Examples achieved weight reduction of the mobile unit because the mobile unit was free from heating units.

The recorder 3 used in Example 2 achieved further reduction in the weight of the mobile unit because the mobile unit did not carry the ink cartridge. However, the length of the ink supply tube connecting the ink cartridge to the head was extended, and consequently the amount of the cleaning solution used was increased.

In Examples 3 and 5, marked curing wrinkles occurred on the image because of the low viscosity of the ink used.

In Example 10, the ink did not cure with LED illumination because the ink 9 used did not contain an acylphosphine oxide compound as the photopolymerization initiator. Consequently, the evaluations of fill-in properties and curing wrinkles were infeasible.

Example 11 involved the recorder 1 which included the illuminators 3 using metal halide lamps. Due to the weight increase by the installation of the metal halide lamps and illuminator cooling devices, the movement of the mobile unit incurred a higher load than in the use of UV emitting diodes.

In Example 12, the ejection stability tended to be decreased because of the high viscosity of the ink used.

Example 14, which involved the illuminators 2 having an illumination intensity of 500 mW/cm$^2$, resulted in the occurrence of marked curing wrinkles on the image.

The recorder 5 used in Example 15 achieved further reduction in the weight of the mobile unit because the mobile unit did not carry the maintenance units. However, this configuration made it impossible to perform the flushing operation during the recording on any one sheet of the recording medium. Further, because the maintenance units were disposed outside the cabinet of the mobile unit and were exposed to constant irradiation with fluorescent light in the room in which the recorder was disposed, the discharged ink which had become attached to the cap and the ink tray increased its viscosity and was resistant to removal.

In Example 16, the notebook computer was not mounted on the mobile unit and thus was connected to the mobile unit via a long wire cord (a USB cable). This configuration resulted in a necessity that the wires be disposed at a position permitting a smooth operation.

The recorder 4 used in Comparative Example 1 failed to perform printing on hard recording media such as acrylic sheets.

Comparative Examples 2 and 3 involved the recorder 2 in which the heating unit was mounted on the mobile unit. Thus, the weight of the mobile unit was significantly increased as compared to the recorders used in Examples.

Comparative Example 2 involved the ink 11 having a high viscosity. Because heating with the heating unit was not performed, the ink ejection stability was significantly lowered.

In Comparative Example 3, the ink 11 having a high viscosity was used after being heated. As a result, good ejection stability was obtained. However, fill-in properties were deteriorated, probably because the ink temperature was decreased during the time from the ejection until the ink landed on the recording medium, and consequently the ink viscosity was increased to make it difficult for the ink to spread on the recording medium. Further, the weight reduction of the mobile unit was not realized due to the installation of the heater.

The recorders used in Examples and Comparative Examples included a single container for an ink having an individual composition. It has been then found that the installation of a plurality of containers containing inks of identical composition in the mobile unit allows the recorder to print images without any interruption during recording of an image, at the price of weight increase of the mobile unit. However, the configurations in this embodiment make it possible to save the weight of the mobile unit as compared to when heating units are mounted on the mobile unit. Thus, the particular usefulness of the configurations in this embodiment has been demonstrated.

The invention is not limited to these embodiments described hereinabove, and various modifications are possible. For example, the scope of the invention includes configurations substantially identical to those described in the embodiments (for example, configurations having the same functions, approaches and results, or configurations having the same objects and effects). Further, the scope of the invention includes configurations resulting from the substitution of non-essential components in the aforementioned embodiments with other components. Furthermore, the scope of the invention includes configurations that achieve the same effects or the same objects as the configurations described in the embodiments. The scope of the invention also includes combinations of the configurations described in the aforementioned embodiments and known configurations.

The entire disclosure of Japanese Patent Application Nos. 2013-065768, filed Mar. 27, 2013 and 2013-181902, filed Sep. 3, 2013 are expressly incorporated by reference herein.

What is claimed is:

1. An ink jet recorder comprising:
   a support unit configured to support a recording medium, and
   a mobile unit including a plurality of containers containing inks of identical composition, and a head configured to eject the ink supplied from any one of the plurality of containers, wherein
   the ink jet recorder is configured to record an image on the recording medium in such a manner that the head performs main scanning by ejecting the ink while changing positions in a first direction, and the mobile unit performs sub-scanning by moving in a second direction intersecting with the first direction,
   a total initial volume of the inks contained in the plurality of containers is not more than 3500 ml and an initial volume of each of the inks contained in each of the plurality of containers is not less than 500 ml, and
   the ink jet recorder is used for recording the image on the recording medium having a recording surface with an area of 0.1 m$^2$ to 7 m$^2$.

2. The ink jet recorder according to claim 1, which is configured such that when the amount of the ink contained in one of the plurality of containers is decreased to or below a prescribed amount, the ink contained in another container is supplied to the head.

3. The ink jet recorder according to claim 1, wherein the mobile unit includes one or more maintenance units configured to perform maintenance of the head.

4. The ink jet recorder according to claim 1, wherein the ink jet recorder is free from a heating unit that heats the ink to obtain a viscosity suited for ejection.

5. The ink jet recorder according to claim 1, wherein the inks are UV curable inks that are cured by UV illumination, and
   the mobile unit includes an illuminator including a UV emitting diode to induce curing of the UV curable inks.

6. The ink jet recorder according to claim 1, wherein the inks are UV curable inks that are cured by UV illumination, and contain an acylphosphine oxide compound as a photopolymerization initiator.

7. The ink jet recorder according to claim 1, wherein the mobile unit is configured to permit an input unit to be mounted thereon, image data to be recorded on the recording medium being input into the input unit.

8. The ink jet recorder according to claim 3, wherein the total mass of the maintenance unit(s) mounted on the mobile unit is not more than 5 kg.

9. The ink jet recorder according to claim 3, wherein the initial mass of the ink per one container of the plurality of containers is smaller than the total mass of the maintenance unit(s) mounted on the mobile unit.

10. The ink jet recorder according to claim 1, wherein the head and each of the plurality of containers are connected to each other via a supply tube, and the length of the supply tube is not more than 3.5 m.

11. An ink jet recorder comprising:

a support unit configured to support a recording medium, a container containing a UV curable ink, and a mobile unit including a head configured to eject the UV curable ink supplied from the container, the mobile unit being free from a heating unit that heats the UV curable ink to lower the viscosity, wherein the inkjet recorder is configured to record an image on the recording medium in such a manner that the head performs main scanning by ejecting the UV curable ink while changing positions in a first direction, and the mobile unit performs sub-scanning by moving in a second direction intersecting with the first direction, a total initial volume of the inks contained in the plurality of containers is not more than 3500 ml and an initial volume of each of the inks contained in each of the plurality of containers is not less than 500 ml, and the ink jet recorder is used for recording the image on the recording medium having a recording surface with an area of 0.1 $m^2$ to 7 $m^2$.

12. The ink jet recorder according to claim 11, wherein the viscosity of the UV curable ink at 20° C. is not more than 20 mPa·s.

13. The ink jet recorder according to claim 11, wherein the UV curable ink contains 40 mass % to 90 mass % of a monofunctional (meth)acrylate, and 5 mass % to 45 mass % of a difunctional or higher functional (meth)acrylate.

14. The ink jet recorder according to claim 11, wherein the UV curable ink is a nonaqueous UV curable ink.

15. The ink jet recorder according to claim 11, wherein the temperature of the UV curable ink as ejected from the head is not more than 35° C.

16. The ink jet recorder according to claim 11, wherein the mobile unit includes an illuminator including a UV emitting diode to induce curing of the UV curable ink.

17. The ink jet recorder according to claim 16, wherein the illuminator is configured to cure the UV curable ink deposited on the recording medium with illumination energy of 200 mJ/$cm^2$ to 1500 mJ/$cm^2$ by illuminating the ink with UV radiation having an emission peak wavelength in the range of 350 nm to 420 nm.

18. The ink jet recorder according to claim 11, wherein the UV curable ink contains a photopolymerization initiator, and the photopolymerization initiator includes an acylphosphine oxide compound.

19. The ink jet recorder according to claim 11, wherein the mobile unit includes one or more maintenance units configured to perform maintenance of the head.

* * * * *